US009009082B1

(12) United States Patent
Marshall et al.

(10) Patent No.: US 9,009,082 B1
(45) Date of Patent: Apr. 14, 2015

(54) ASSESSING USER-SUPPLIED EVALUATIONS

(75) Inventors: Anne R. Marshall, Seattle, WA (US); James G. Robinson, Olympia, WA (US); Sameer R. Rajyaguru, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1814 days.

(21) Appl. No.: 12/165,398

(22) Filed: Jun. 30, 2008

(51) Int. Cl.
*G06F 17/00* (2006.01)
*G06Q 30/00* (2012.01)
*G06Q 30/06* (2012.01)
*G06Q 99/00* (2006.01)

(52) U.S. Cl.
CPC ............ *G06Q 30/0601* (2013.01); *G06Q 99/00* (2013.01)

(58) Field of Classification Search
None
See application file for complete search history.

(56) References Cited

U.S. PATENT DOCUMENTS

| | | | |
|---|---|---|---|
| 6,041,311 A | 3/2000 | Chislenko et al. | |
| 6,064,980 A | 5/2000 | Jacobi et al. | |
| 6,260,019 B1 | 7/2001 | Courts | |
| 6,505,202 B1 | 1/2003 | Mosquera et al. | |
| 6,874,143 B1 | 3/2005 | Murray et al. | |
| 6,895,385 B1 | 5/2005 | Zacharia et al. | |
| 7,519,562 B1 * | 4/2009 | Vander Mey et al. | 705/500 |
| 2002/0107861 A1 | 8/2002 | Clendinning et al. | |
| 2002/0194119 A1 | 12/2002 | Wright et al. | |
| 2002/0198866 A1 | 12/2002 | Kraft et al. | |
| 2003/0078804 A1 | 4/2003 | Morrel-Samuels | |
| 2005/0034071 A1 | 2/2005 | Musgrove et al. | |
| 2005/0060665 A1 | 3/2005 | Rekimoto | |
| 2006/0042483 A1 | 3/2006 | Work et al. | |
| 2006/0143068 A1 | 6/2006 | Calabria | |
| 2007/0050192 A1 | 3/2007 | Gutta et al. | |

OTHER PUBLICATIONS

U.S. Appl. No. 11/038,453, filed Jan. 18, 2005, for Hilliard B. Siegel, 39 pages.
U.S. Appl. No. 11/096,699, filed Mar. 31, 2005, for Christopher Vander Mey, 90 pages.
"Can You Trust Web 2.0?" .Net Magazine, Apr. 23, 2008, retrieved Jun. 17, 2008 from http://www.netmag.co.uk/zine/discover-culture/can-you-trust-web-2-0, 4 pages.
Microsoft Press Computer Dictionary, Third Edition, Microsoft Press, Redmond, 1997, p. 341.

(Continued)

*Primary Examiner* — Ryan Zeender
*Assistant Examiner* — Denisse Ortiz Roman
(74) *Attorney, Agent, or Firm* — Seed IP Law Group PLLC

(57) ABSTRACT

Techniques are described for assessing information supplied by users in various ways, such as to assess the reliability and/or other attributes of the user-supplied information. In at least some situations, the user-supplied information includes votes or other evaluations supplied by users related to items available from an online merchant, such as ratings of usefulness or other attributes of item reviews for the items or of other types of content pieces that are provided by other users. If user-supplied information is assessed as being sufficiently reliable and/or to have other desired attributes of interest, such as based on an automated analysis of the information, the user-supplied information may be used in various ways in various embodiments, such as to rate the quality or other attributes of the evaluated content pieces, and/or to rate quality or other attributes of the content-providing users who provide the content pieces.

26 Claims, 9 Drawing Sheets

(56) References Cited

OTHER PUBLICATIONS

Kaufman, L., "Amazon.com Plans a Transformation to Internet Bazaar," New York Times, Late Edition, Final Edition, col. 1, p. 1, Thursday, Sep. 30, 1999, 3 pages.

Kuo, Yufeng et al, "Survey of Fraud Detection Techniques," Proceedings of the 2004 International Conference on Networking, Sensing, and Control, p. 749-754, Teipei, Taiwan, Mar. 21-23, 2004, retrieved from http://europa.nvc,cs,vt,edu/~yfkou/research.htm, 6 pages.

\* cited by examiner

*Fig. 2*

**Already Own It?
Rate It!**

To improve your
recommendations,
rate this product:

○ Not Rated
○ ★
○ ★★
○ ★★★
○ ★★★★
○ ★★★★★

☐ I own it
[ Rate it ]

wonders of the Kremlin and Red Square; from the legendary Pushkin Theater to the dramatic site of the Odessa Steps immortalized in Eisenstein's classic film *The Battleship Potemkin*; from breathtaking views of the Black Sea to the calm of a sleeping city on a winter night; this is the world that inspired the eternal genius of Tchaikovsky.

Was this content helpful to you? [YES] [NO] —417

---

All Customer Reviews —425
Avg. Customer Rating: ★★★★☆
—421
Write an online review and share your thoughts with other shoppers!

★★★★☆ /Still not quite perfect but very nice/ indeed, March 24, 2001
TOP 10 Reviewer: Reviewer C (see more about me)   from Keene, NH USA
*Reviewer*  DVD International has added a new entry to its Naxos Musical Journey series:
Tchaikovski's <Symphony No. 6 [and the] Eugene Onegin Ballet Music> (DVDI 1010).
Using the Naxos recording with the Polish National Radio Symphony Orchestra (Antoni Wit) for the Symphony and the Czecho-Slovak Radio Symphony Orchestra (Ondrej Lenard) for the ballet, the visual format is a tour of locales in St. Petersburg, Moscow, Odessa, Ukraine, and the Crimea.

The first movement of the Symphony is exemplary in its coordination of natural settings with the mood and quick changes of mood in the orchestra: dark blue skies and waters for the Adagio, brighter scenes of mountains and lakes for the Allegro non troppo. The last movement (Adagio lamentoso-Andante) is treated with equal skill. However, the bouncy third movement (Allegro con grazia) suffers from a case of the cutes with people going up and down the famous Odessa steps in time to the music and other shots of people not at all in synch with the music. The second movement starts with a closeup of a frog and gets too much involved with people rather than scenes.

Both of the Onegin pieces suffer from the same desire to show milling throngs, although there are several moments in the Polonaise when music and picture get together in a very powerful way.

It would have been most helpful if DVDI gave us the locale on the printed notes, since it is awkward to bring up that information from the menu when you want to know where you are. Still in all, not a bad offering in this ambitious but still not perfect series.
Was this review humorous? [No][A little][Moderately][A lot][A laugh riot] —— 415
Was this review useful to you? [1][2][3][4][5] (5 is most useful, 1 is least useful)

*Fig. 4*

ASSESSING USER-SUPPLIED EVALUATIONS

BACKGROUND

As the Internet and other online access to information continues to grow, users are increasingly presented with an overabundance of available information content without effective means to manage it (e.g., to identify content that is relevant, accurate and enjoyable), or to identify users who create content that has desired attributes. One particular example of an increasing source of content relates to merchants that make items (e.g., products, services, information, etc.) available to customers for purchase, rent, lease, license, trade, evaluation, sampling, subscription, etc., such as via the World Wide Web ("the Web"). Some Web merchants design their Web sites to display content in order to draw interest to items available from the Web site, such as item reviews and item pictures that are prepared by the operator of the Web site or the manufacturer/distributor of the item to provide additional information about an item. In addition, in some cases, volunteer users of a Web site, such as customers of a merchant's Web site, may prepare and supply at least some such content for use by other users. Furthermore, in some situations, users of a Web site may be allowed to evaluate content available on the Web site, such as content provided by an operator of the Web site.

BRIEF DESCRIPTION OF THE DRAWINGS

Figure 2:
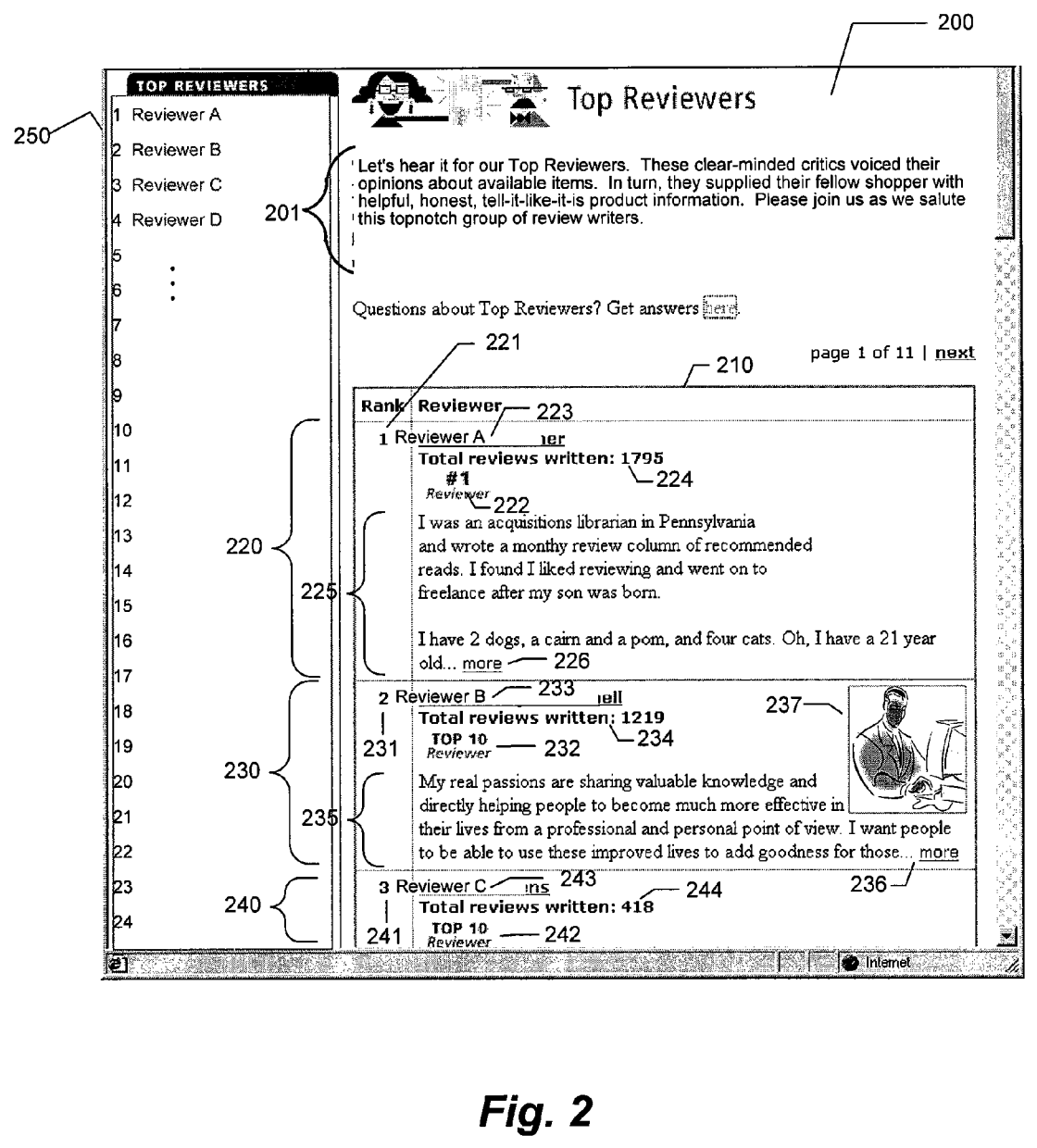

FIGS. 2-6 are display diagrams illustrating examples of displays for presenting and evaluating user-supplied content.

DETAILED DESCRIPTION

Figure 1:
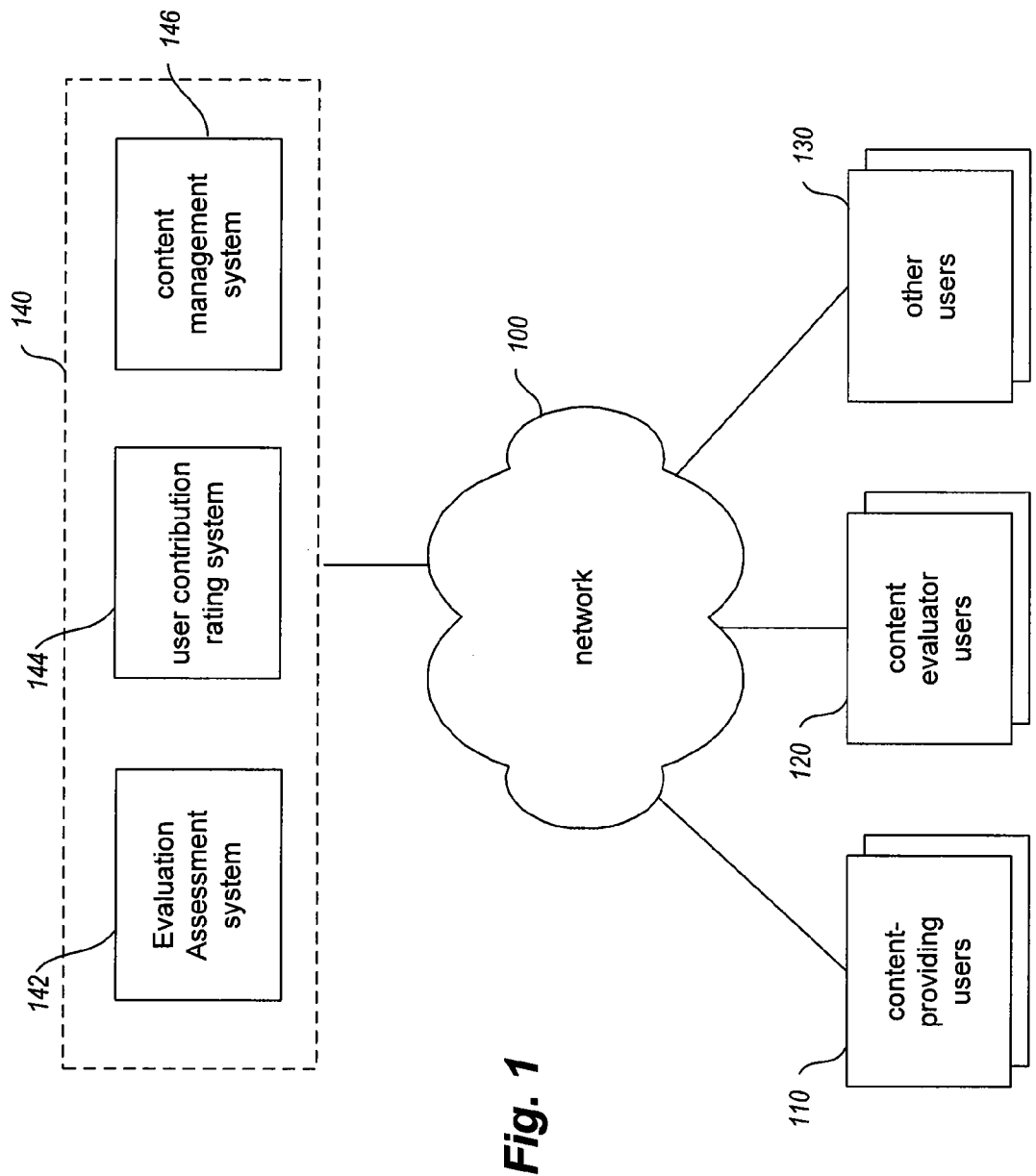
FIG. 1 is a network diagram illustrating an example embodiment of interactions to assess user-supplied evaluations.

Techniques are described for assessing information supplied by users in various ways, such as to assess the reliability and/or other attributes of the user-supplied information. If user-supplied information is assessed as being sufficiently reliable and/or to have other desired attributes of interest, such as based on an automated analysis of the information, the user-supplied information may be used in various ways in various embodiments. The user-supplied information may have various forms in various embodiments, such as votes or other evaluations supplied by evaluator users related to objects associated with other users, such as ratings of usefulness or other attributes of the objects. As one example, in some embodiments, the evaluated objects may be related to items offered by an online merchant, such as textual or other item reviews of the items that are provided by or otherwise associated with users other than the evaluator users who supply the evaluations, or such as items for which the associated users act as a source of the items. User-supplied evaluations that are assessed as being sufficiently reliable and/or having other desired attributes of interest may then be used for one or more purposes, such as to rate the quality or other attributes of evaluated item review objects, and/or to rate quality or other attributes of the content-providing users who provide the item reviews. Other user-supplied evaluations may be handled in other manners, such as to exclude the use of unreliable evaluations (e.g., evaluations that appear likely to be intentionally fraudulent, such as in an attempt to artificially manipulate the rating system for particular item reviews and/or users, or evaluations that are biased in manners other than being intentionally fraudulent). The assessment of the user-supplied information may be performed in various manners, as discussed in greater detail below, and may be automatically performed by an automated Evaluation Assessment system in at least some embodiments.

As noted above, the user-supplied information that is assessed in at least some embodiments is user-supplied evaluations of objects that are pieces of content, such as content pieces that are provided by other users or in other manners. In some embodiments, the users who provide content are author users who create some or all of the content that they provide, while in other embodiments and situations such users may provide other types of content (e.g., content that is identified and/or selected by the users, but not created by the users). In addition, content pieces provided by the users may have various forms in various embodiments, and may be used for various purposes. For example, the following is a non-exclusive list of various forms of content pieces in various embodiments: a product review or other item review, a how-to guide or other instructional information related to one or more topics, a blog or blog blurb (or other entry in or portion of a blog), another form of textual passage (e.g., a story, poem, recipe, etc.), a discussion board or message thread or an entry in such a board or thread, a media file or streaming media clip (e.g., a photo or other image, a video, a music sample or other audio clip, etc.), an advertisement (e.g., a textual advertisement; an advertisement that includes one or more other types of content pieces, such as images; etc.), a user profile from a social networking site or other information related to social networking, an advertisement, a computer program or portion of computer code, a software module or utility or library, a list of related items or other elements (e.g., pieces of information of one or more types, indications of other lists or other content pieces, etc.) or other type of list, etc. More generally, a piece of content that is provided may in some embodiments be any information that has one or more attributes that can be evaluated by other users (e.g., information that includes one or more factual assertions or opinions, with the evaluations used to certify the accuracy and/or truthfulness of those assertions, or information that is to be evaluated based on one or more subjective standards, such as elegance or beauty). Moreover, in some embodiments, the pieces of content may be provided to an organization for use by the organization, such as for possible display to other users of the organization. The organization may be, for example, a Web merchant or other online merchant whose users are customers of the merchant, or may act as an online or other content provision service that provides content pieces of users (e.g., a fee-based commercial content provision service that provides content pieces to customers as at least part of a business, a non-commercial content provision services that provides content pieces to users without obtaining payment from those users, etc.). In other embodiments, objects other than content pieces may be evaluated, whether instead of or in addition to content pieces, including items supplied by or otherwise associated with one or more users, and other types of objects.

The assessment of the reliability of user-supplied evaluations or other user-supplied information may be performed in various manners in various embodiments. In particular, in some embodiments, user-supplied evaluations by evaluator users of content pieces provided by other content-providing users are assessed so as to determine whether a bias relationship is likely to exist between an evaluator user and a content-providing user whose provided content is evaluated by the evaluator user. Such a bias relationship between an evaluator user and a content-providing user may reflect a positive affinity or bias of the evaluator user to the content-providing user (also referred to as the evaluator user being a "fan" of the content-providing user), such as when the evaluations are higher than is warranted by the content pieces being evaluated, and/or a negative affinity or bias of the evaluator user to the content-providing user (also referred to as the evaluator user being a "critic" of the content-providing user), such as when the evaluations are lower than is warranted by the content pieces being evaluated. In addition, while such bias relationships between evaluator users and content-providing users may be created intentionally by the evaluator users in some situations (e.g., in a fraudulent attempt to artificially increase or decrease the rating or other status of a particular content-providing user and/or such a content-providing user's provided content pieces), in other situations such bias relationships may represent an honest but biased belief by the evaluator user of the validity of the provided evaluations, whether or not the evaluator user is aware of that bias.

The assessment of a bias relationship between an evaluator user and a content-providing user may be performed in various manners in various embodiments, such as based on a combination of multiple evaluations by the evaluator user for content pieces provided by the content-providing user. For example, as discussed in greater detail below, assessments of multiple evaluations by an evaluator user may include one or more of the following non-exclusive list of bias assessment types: detection of consistently low or high evaluations by the evaluator user of content pieces provided by a particular content-providing user (e.g., evaluations that are above or below predefined thresholds); detection of least a minimum percentage or total number of content pieces provided by a particular content-providing user that are evaluated by the evaluator user (e.g., for recently provided content pieces, all content pieces, etc.); detection of least a minimum percentage or total number of evaluations by the evaluator user that are for content pieces provided by a particular content-providing user (e.g., for recently provided evaluations, all evaluations, etc.); detection of least a minimum percentage or total number of evaluations by the evaluator user that are for multiple content pieces provided by multiple content-providing users related to a single item or other topic (e.g., so as to evaluate a particular content-providing user's content piece high or low, and to evaluate most or all of the other related content pieces in the opposite manner); etc.

In addition, the assessment of a bias relationship between an evaluator user and a content-providing user may in some embodiments include determining a series or other group of evaluations by the evaluator user for content pieces from the content-providing user that in aggregate provide evidence of sufficient likelihood of the evaluations being biased or otherwise unreliable, such as some or all such evaluations during a period of time for which the bias relationship is identified as being likely to exist. In such embodiments, the influence of the evaluations of the determined group may be excluded or devalued for at least some purposes, such as for use in determining aggregate ratings for the content-providing user and/or the content pieces that are evaluated. However, in at least some embodiments, the existence of a determined bias relationship between an evaluator user and content-providing user for a period of time may not have an effect on evaluations by the evaluator user that are outside of that bias relationship, such as evaluations by the evaluator user for content pieces provided by other content-providing users and/or evaluations by the evaluator user for that content-providing user that occur outside of the period of time.

In addition, in some embodiments, information about a determined bias relationship between an evaluator user and a content-providing user may be used in other manners, such as to personalize or otherwise customize interactions with an evaluator user in accordance with the evaluator user's determined bias relationships (e.g., to not provide content pieces to the evaluator user that are provided by a content-providing user of whom the evaluator user is a critic; to provide content pieces to the evaluator user that are provided by a content-providing user of whom the evaluator user is a fan; to modify interactions with an evaluator user based on preferences of other users, such as other evaluator users who share being a fan or critic of one or more content-providing users with the evaluator user, or such as content-providing users with whom the evaluator user has a fan and/or critic relationship; etc.). In some embodiments, information about at least some such determined bias relationships may be provided to at least some users, such as to display information to content-providing users and/or other users of how many fans (and/or critics) that a particular content-providing user has, to display information to evaluator users and/or to other users of particular content-providing users with whom the evaluator user has a fan (and/or critic) relationship, etc. Furthermore, in some embodiments, such as those in which information about bias relationships is used in one or more such other manners, at least some users may be allowed to identify at least some types of such bias relationships, such as for an evaluator user to self-identify himself or herself as a fan of a particular content-providing user, or such as for a content-providing user to identify a particular evaluator user as potentially being a critic of the content-providing user (e.g., so as to trigger a review of at least some past and/or future evaluations of that evaluator user with respect to content pieces provided by the content-providing user).

As previously noted, the assessment of the reliability of user-supplied evaluations or other user-supplied information may in some embodiments include determining whether a bias relationship exists between an evaluator user and a content-providing user. Furthermore, in other embodiments, other types of reliability assessments may be performed for user-supplied evaluations or other user-supplied information, whether in addition to or instead of such bias relationship determinations. For example, in some embodiments, the assessment of the reliability of user-supplied evaluations may include determining whether one or more evaluations are duplicates, such as multiple identical or overlapping evaluations (e.g., multiple evaluations for the same content piece that include the same or sufficiently similar ratings) that are supplied by a single evaluator user who attempts to disguise that he/she is the source of all the evaluations by using multiple different user accounts (e.g., user accounts of an online merchant or other organization that makes content pieces available to customers or other users), or by multiple different evaluator users who are working in concert to consistently perform block voting by supplying the same or similar evaluations of the same content pieces. If multiple duplicate evaluations are identified, all of the duplicate evaluations may in some embodiments be identified as unreliable, while in other embodiments a single one of the evaluations may treated as reliable (e.g., so as to give influence to the first evaluation but not to subsequent evaluations that are duplicates of the first evaluation). A single evaluator user who uses multiple different user accounts may be detected in various manners in various embodiments, such as based on sharing between the user accounts some or all contact information (e.g., a physical address for item deliveries or for other purposes, telephone number, email address, etc.), electronic network address information (e.g., using the same or sufficiently similar IP addresses or other network addresses; using the same physical computing system, such as identified by software cookies or other unique information associated with the computing system; etc.), financial or identification information (e.g., credit card numbers, driver's license numbers, etc.), etc. Additional details are included below regarding assessing the reliability of user-supplied evaluations or other user-supplied information in manners other than determining existence of bias relationships.

FIG. 1 is a network diagram that illustrates an example environment in which content-providing users may provide pieces of content to a remote system, which in this example embodiment is a content management system 146. In this example, various users interact with the content management system 146 via a network 100, and an embodiment of an Evaluation Assessment system 142 operates to assess evaluations received from evaluator users for content pieces provided by content-providing users, such as to determine evaluations from an evaluator user that are not sufficiently reliable based on a determined bias relationship between the evaluator user and one or more content-providing users and/or based on one or more other types of reliability assessments. In addition, in this example, an embodiment of a user contribution rating system 144 operates to assess content-providing users, such as based on evaluations of content pieces provided by the content-providing users that are sufficiently reliable as determined by the Evaluation Assessment system 142. While not illustrated here, a content quality rating system may also optionally be present to assess aggregate quality ratings or other ratings for content pieces, such as based on evaluations of the content pieces that are sufficiently reliable as determined by the Evaluation Assessment system 142. In particular, in this example, content-providing users 110 interact with the content management system 146 over a network 100 to provide one or more content pieces for use by the content management system, such as for the content management system 146 to distribute the content pieces to content evaluator users 120 and/or other users 130 via the network 100.

The illustrated network 100 may be, for example, a publicly accessible network of linked networks, possibly operated by various distinct parties (e.g., the Internet). In other embodiments, the network 100 may be a private network (e.g., a corporate, university, etc.) that is wholly or partially inaccessible to non-privileged users. In still other embodiments, the network 100 may include one or more private networks with access to and/or from other private and/or public networks. In this illustrated example, the various users 110, 120, and 130 may use computing systems and/or devices (not shown) to interact with the content management system 146 to obtain various functionality, and in doing so may obtain and/or provide various types of information (e.g., user-provided content pieces, evaluations, etc.). The interactions of the users with the content management system 146 may occur in various ways in various embodiments, such as, for example, in an interactive manner via one or more graphical user interfaces provided to the users (e.g., a graphical Web-based user interface via a Web browser), or in a programmatic manner based on an API ("application programming interface") provided by the content management system 146 to allow other computing systems and programs to programmatically invoke such functionality, such as using Web services or other messaging or networking protocols.

In the illustrated embodiment, the content management system 146 may be operated by an organization or other entity 140 that gathers and/or distributes content, with the entity 140 optionally also operating the Evaluation Assessment system 142 and/or the user contribution rating system 144 in this example, although in other embodiments the Evaluation Assessment system 142 may be operated by a third party to the entity 140 (e.g., in a fee-based manner to support one or more remote content management systems). Various users, including the users 110, 120 and/or 130, may interact with the content management system 146 (and/or with another system, not shown, that has access to content pieces provided to the content management system 146 by the content-providing users 110) to obtain information that may include at least some of the content pieces provided by content-providing users 110. For example, content pieces received from the content-providing users may be provided in part or in whole to other users for presentation to those other users, such as via various content presentation software programs available to the other users (e.g., Web browsers, media players, content readers, etc.). As one illustrative example discussed in more detail below, the content management system may be part of a Web merchant or other online merchant that sells or otherwise makes items available to customer users, and the content-providing users may be customers of the merchant who submit content pieces that are related to the available items (e.g., reviews of the items, images of the items, instructional guides related to use of the items, etc.). In such embodiments, the merchant may use the customer-provided content pieces in various ways, such as to provide some or all of them to other customers, such as in conjunction with other information provided by the merchants (e.g., product information related to products available from the merchant). It will be appreciated that content may be distributed from a content-providing user or other content-providing entity to other users in various other ways in other embodiments (e.g., by using broadcast techniques, peer-to-peer distribution techniques, etc.).

The content evaluator users 120 in this illustrated embodiment interact with content management system 146 to evaluate content pieces submitted by the content-providing users 110. As previously noted, content pieces may be evaluated on the basis of one or more attributes of interest of the content pieces, such as usefulness, humor, excellence, beauty, etc. In the illustrated embodiment, the content evaluator users 120 may interact with the content management system 146 to obtain content pieces submitted by content-providing users 110, and to provide evaluations of content pieces with respect to one or more of various attributes, such as by submitting votes on and/or ratings regarding the one or more attributes. As discussed in more detail elsewhere, such evaluations of content pieces may be used, for example, to determine an aggregate quality rating for content pieces provided by a particular content-providing user and/or to assist in determining a user contribution rating of the content-providing user (e.g., based in part on a determined aggregate quality rating of the content pieces provided by the content-providing user), such as if the evaluations are determined to be sufficiently reliable (or are not determined to be sufficiently unreliable). In some embodiments, evaluations of content pieces may further be used to determine content quality ratings for the content pieces, such as by generating an individual content quality rating for each content piece based at least in part on the evaluations received for that content piece, and in some such embodiments, such content quality ratings may be used at least in part to determine a user contribution rating of the content-providing user who provided the content pieces.

In the illustrated embodiment, the Evaluation Assessment system 142 operates to assess the reliability of evaluations provided by the evaluator users 120, such as by determining bias relationships between particular evaluator users and content-providing users and/or by using one or more other types of assessments. As previously noted, such determining of bias relationships may be based on use of one or more bias assessment types. As one illustrative example, in some embodiments, the evaluations are assessed by tracking the series of evaluations for each combination of an evaluator user and a content-providing user, and then determining whether a particular series of evaluations is consistently low or high (e.g., above or below predefined thresholds). Such evaluation consistency may be determined based on, for example, having a series that includes a number of evaluations that at least reaches a quantity threshold and that includes a percentage of consistency in those evaluations that at least reaches a consistency threshold, such as, for example, at least 6 evaluations and 85% consistency. Using that particular consistency example of at least 6 evaluations and 85% consistency, consider a situation in which a first evaluator user contributes 14 total evaluations for content pieces that alternate between those provided by two content-providing users A and B (i.e., an ordered group of evaluations $E_{A1}$, $E_{B1}$, $E_{A2}$, $E_{B2}$, $E_{A3}$, $E_{B3}$, $E_{A4}$, $E_{B4}$, $E_{A5}$, $E_{B5}$, $E_{A6}$, $E_{B6}$, $E_{A7}$, $E_{B7}$, with the subscripts indicating the content-providing user and the cumulative number of evaluations of content pieces provided by that content providing user), with each of the evaluations being a yes or no vote with respect to whether the content being evaluated is useful. If evaluation $E_{A4}$ is a no vote while all of the other 6 $E_{AX}$ votes (with X being an integer) are yes votes, then the evaluator user would be determined to have a likely bias relationship as a fan of content-providing user A (based on 7 total votes and 6-of-7, or 85.7%, being consistently positive). In such situations, all 7 votes $E_{A1}$-$E_{A7}$ may be excluded from determining ratings of content-providing user A and his/her provided content pieces.

If the same vote pattern and thresholds exist as in the prior example, but without the $E_{A7}$ vote, the evaluator user would not be considered a fan, since the 5-of-6 positive ratings at 83.3% do not exceed the 85% consistency threshold. However, such a voting pattern may nonetheless demonstrate a bias relationship between the evaluator user and content-providing user A on the basis of another bias assessment type, such as if the 7 votes correspond to evaluations of 7 of 8 total content pieces provided by content-providing user A, and a different assessment type detects bias based on having a series of evaluations with a quantity threshold of 5 and with a percentage of the content-providing user's total provided content pieces having been evaluated that reaches at least a totality threshold of 75%. Alternatively, another bias assessment type may identify a bias relationship between an evaluator user and a content-providing user based on a series of evaluations by the evaluator user for content pieces provided by that content-providing user if the number of evaluations in the series at least reaches a quantity threshold of 5 and at least 50% of the evaluator's total evaluations are in that series—if so, then the 7 votes $E_{A1}$-$E_{A7}$ demonstrate a bias relationship between the evaluator user and content-providing user A on that basis (assuming that the 14 example evaluations are all the evaluations performed by the evaluator user), and the 7 votes $E_{B1}$-$E_{B7}$ similarly demonstrate a bias relationship between the evaluator user and content-providing user B on that basis (given the same assumption). As another example, if the same vote pattern exists as before with 7 votes $E_{A1}$-$E_{A7}$, but with the votes being integer ratings on a scale of 1-to-5 and with a consistency threshold for a critic being an average rating below 1.75, then ratings of 1, 3, 1, 3, 1, 1, 1 for the 7 votes $E_{A1}$-$E_{A7}$ would be determined to have a bias relationship with the evaluator user being a critic of content-providing user A (based on an average value of 1.57 for those 7 ratings). Similar ratings of 5, 3, 1, 1, 1, 1, 1 for the 7 votes $E_{B1}$-$E_{B7}$ would not be determined to have a bias relationship of the evaluator user being a critic of content-providing user B, however, based on an average value of 1.86 for those 7 ratings—if the quantity threshold is 6 votes, however, then these 6 votes $E_{A2}$-$E_{A7}$ would be determined to have a bias relationship with the evaluator user as a critic of content-providing user A (based on an average value of 1.33 for those 6 ratings).

In addition, such determinations may be altered based on a variety of factors in various embodiments. For example, with respect to the evaluation consistency determination, the consistency threshold may vary with the quantity of evaluations, such that at least an 85% consistency threshold is needed for 6 evaluations, but the consistency threshold drops to a lower value as the number of evaluations rises (e.g., 80% when 20 or more evaluations are received for a series, or with the consistency threshold changing as a function of the number of evaluations). In addition, with respect to the evaluation consistency determination, the quantity threshold and/or consistency threshold may be modified for a particular evaluator user if other indicia exist that the evaluator user may be less reliable or more reliable than is typical, such as based on one or more characteristics of the evaluator user. For example, if the evaluation consistency determination is performed for a merchant for which the evaluator user is a potential customer, the evaluation consistency determination may include determining that a particular evaluator user is unreliable based on user characteristics such as the evaluator user's account being recently opened and/or not having been used to make any purchases, and accordingly reducing the quantity threshold to 2 evaluations, such as in conjunction with a 100% consistency threshold. Alternatively, in other embodiments, the evaluation consistency determination may include determining that a particular evaluator user is more reliable than average based on the evaluator user having user characteristics such as having a verified or otherwise corroborated his/her identity, having previously contributed content pieces or made purchases or performed other actions of one or more types, etc. Similarly, in at least some embodiments, a quantity threshold and/or consistency threshold used for a particular evaluator user may be varied based on a recency of the evaluator user performing one or more of various actions, including making purchases, opening a user account, supplying one or more evaluations (e.g., one or more evaluations of content pieces supplied by a particular author user, such that the quantity threshold and/or consistency threshold used for a particular evaluator user may vary based on the particular author user whose content pieces are evaluated), supplying one or more content pieces, having verified or otherwise corroborated his/her identity, etc. Furthermore, in some embodiments, different evaluations may be given different weights, such as based on recency (e.g., to weight more recent evaluations more highly than less recent evaluations)—if so, the prior example rating pattern of 5, 3, 1, 1, 1, 1, 1 for the 7 votes $E_{B1}$-$E_{B7}$ may be determined to reflect a bias relationship of the evaluator user as, a critic of content-providing user B, such as if recency-based weights of 0.5, 0.7, 0.9, 1, 1.1, 1.3 and 1.5 are given to the 7 votes $E_{B1}$-$E_{B7}$, resulting in a weighted average rating of 1.49 for those 7 ratings.

As previously noted, if a particular evaluator user has associated indicia of possible unreliability (e.g., the evaluator user's account is recently opened and/or has not been used to make any purchases), an example bias relationship determination may be made using a quantity threshold of 2 evaluations and a 100% consistency threshold. In such a situation, consider example votes $E_{B1}$-$E_{B7}$ with values of no, yes, yes, yes, no, no, yes. In this situation, vote $E_{B1}$ does not correspond to a bias relationship, but each of votes $E_{B2}$-$E_{B4}$ will be considered to reflect a determined fan bias relationship between the evaluator user and the content-providing user B for the time period during which those 3 votes are received (however, if vote $E_{B2}$ is initially assessed when it is received before vote $E_{B3}$ is received, vote $E_{B2}$ will not yet be considered unreliable since a series of votes $E_{B1}$ and $E_{B2}$ do not yet reflect a bias relationship). Similarly, each of votes $E_{B5}$-$E_{B6}$ will be considered to reflect a determined critic bias relationship between the evaluator user and the content-providing user B for the time period during which those 2 votes are received, which ends at or for receiving vote $E_{B5}$, thus illustrating that determined bias relationships may exist only at certain times and may change over time.

It will be appreciated that the prior example evaluations, thresholds, assessment types, and assessment results are provided for the purposes of illustration only, and that various other types of evaluations, thresholds, assessment types, and assessment results may be used in other examples.

After at least some of the evaluations from the evaluator users 120 are determined by the Evaluation Assessment system 142 to be sufficiently reliable (or not determined to be sufficiently unreliable), the user contribution rating system 144 in the illustrated embodiment operates to assess some or all of the content-providing users 110 based at least in part on the content pieces submitted by the content-providing users 110 and those reliable evaluations for those content pieces. For example, the user contribution rating system 144 may assess a particular content-providing user based on the content pieces provided by that content-providing user, such as by generating a user contribution rating for the content-providing user based on a combination of multiple factors related to the provided content pieces, including one or more qualities of the content pieces submitted by the content-providing user that are determined based on the reliable evaluations and/or in another manner (e.g., such as based on one or more evaluated attributes of the content pieces).

In addition, in at least some embodiments, the Evaluation Assessment system 142 may determine bias relationships or otherwise assess evaluations by grouping particular evaluations based on various characteristics of the evaluations or of the content pieces being evaluated. In various embodiments, different groupings of evaluations, and corresponding determining of bias relationships individually for each of some or all of those groupings, may include the following: to correspond to one or more particular types of content pieces (e.g., item reviews, images, etc.); to reflect supplied content pieces that correspond to one or more particular categories or groups of items (e.g., books, DVDs, consumer electronics, etc.); etc.

Furthermore, in some embodiments, the illustrated user contribution rating system 144 may generate ranking information for at least some content-providing users based on generated user contribution ratings of those content-providing users, such as relative to other content-providing users (e.g., based on those other content-providing users' generated user contribution ratings). Such generated user ranking information may be used in various manners, such as to identify one or more top-ranked content-providing users (e.g., to create and/or maintain one or more "leader boards" or "ladders" or other lists of content-providing users based on user contribution ratings and/or other information about content-providing users, such as to have one such list for each of one or more types of user contribution ratings), to identify one or more content-providing users to reward based on their contributions, to manage content in various ways, etc. Such created and/or maintained lists of content-providing users may be used by the system 144 in various ways, such as to display information about some or all content-providing users on the lists to those users and/or to other users (e.g., to all users of the system 146). In other embodiments, one or more such lists may be created based on other types of information about content-providing users (or other users), such as a list of top-rated content-providing users based on user contribution ratings of those users (e.g., ratings of a particular type if multiple types of user contribution ratings are used). Furthermore, in some embodiments, other types of information may be displayed for some or all content-providing users, such as to indicate for a content-providing user the number of evaluator users and/or other users that are identified by the system 144 and/or self-identified by those users as being fans or critics of the content-providing user, or other types of information discussed in greater detail below.

In some embodiments, the content management system 146 may perform various other functions, such as, for example, storing content pieces provided by content-providing users for later use by the system 146 and/or by others (e.g., in a database or other data storage system); providing other content in addition to or instead of user-provided content to various parties (e.g., entities, users, etc.); providing information related to assessed user contribution ratings and/or user rankings to various parties; providing information to various parties related to determined fans and/or critics of at least some content-providing users; personalizing or otherwise customizing information provided to at least some users based at least in part on determined fan and/or critic relationships of those users to other users and/or of other users to those users; identifying content pieces that have or are likely to have attributes of interest to one or more users, such as based on assessed user contribution ratings of the content-providing users who provided the identified content pieces (e.g., content pieces that are useful and/or humorous); etc.

Although the Evaluation Assessment system 142, user contribution rating system 144 and the content management system 146 have been described in this example as being distinct systems, in other embodiments some or all of the functionality of the systems 142, 144 and 146 may be combined into a single system. In addition, it will be appreciated that in some situations, various of the users 110, 120 and 130 may operate in different roles, such as at different times and/or for different content pieces. For example, a content-providing user 110 may also act as a content evaluator user 120, such as when the content-providing user 110 evaluates content pieces provided by other content-providing users, and/or as another user 130, such as when one or more content pieces provided by other content-providing users are provided to the content-providing user 110. Similarly, content evaluator users 120 and other users 130 may act as content-providing users 110 and each other in different situations. As one particular example, in some embodiments, any user may be allowed to act as an evaluator user for content pieces provided by other users (e.g., when the evaluator user receives a content piece that is selected for the evaluator user by the content management system 146, when the evaluator user selects a content piece to be evaluated, etc.), and/or any user may be allowed to act as a content-providing user, while in other embodiments only particular users may be allowed to perform particular actions, or users may be allowed to perform particular actions only in particular circumstances.

Figure 5:
Figure 6:

FIGS. 2-6 illustrate examples of displays for obtaining, presenting and evaluating user-supplied content and for presenting information about top-ranked content-providing users, such as content-providing users ranked according to one or more generated user contribution ratings. In particular, FIGS. 2-5 show examples of ways in which information about top-ranked content-providing users can be provided to users of a Web site, with the content-providing users in this example being "reviewer" author users who are supplying item review content pieces and who are referred to generically as "Reviewer A" author user, "Reviewer B" author user, etc. FIG. 6 illustrates an example display that enables a content-providing author user to submit a new item review piece of content, with analogous information to allow evaluating users to submit evaluations similarly able to be provided (although not shown here for the sake of brevity). These examples are provided for illustrative purposes and are simplified for the sake of brevity, and the inventive techniques can be used in a wide variety of other situations, including with other types of content, other types of users, other types of evaluations, and by entities other than merchants.

Figure 3:
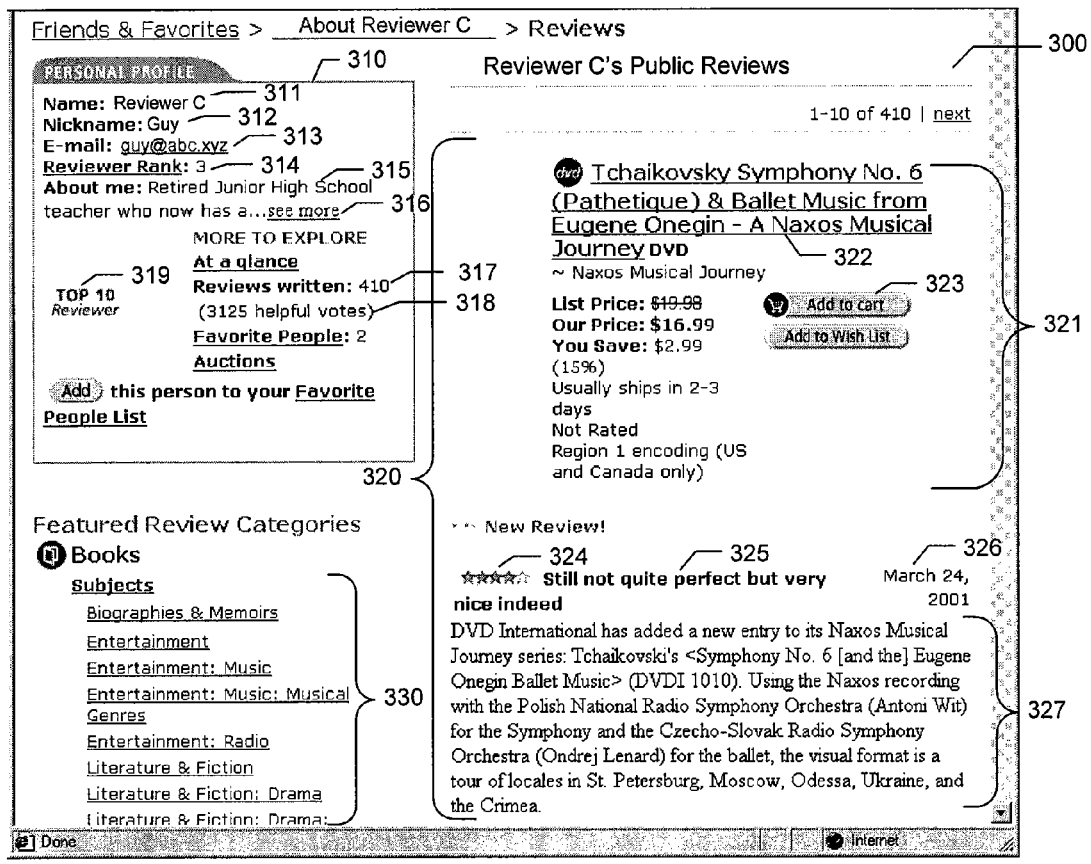

In particular, FIG. 3 is a display diagram illustrating an example of a display 300 that provides information about a particular highly ranked reviewer user Reviewer C, including an example of an item review piece of content 327 that is authored by the user, with analogous information about a particular top-ranked evaluator similarly able to be provided (although not shown here for the sake of brevity). This example display is displayed as part of an example Web site of an example Web merchant, and contains various information 320 related to the review 327, such as information 321 about the item being reviewed (e.g., the title, artist, format, price, and availability of the item), a link 322 that may be used to display more information about the item, and a control 323 that may be used to initiate the placement of an order for the item. The information 320 also includes a rating or grade 324 assigned by the reviewer to the item as part of the review—here the grade shown is four stars out of five stars, and the review's title 325 and date on which the review was submitted 326 are also displayed. The illustrated display also contains more general information about reviews submitted by the reviewer, including a section 330 that illustrates item categories for which the reviewer has submitted reviews.

In this example, the display 300 further includes a profile 310 for the reviewer, with such information as the reviewer's name 311, a nickname 312 for the reviewer, an email address 313 for the reviewer, the current rank 314 of the reviewer, the beginning of a biographical sketch 315 of the reviewer, a link 316 to the entire biographical sketch of the reviewer, a count 317 of the quantity of reviews submitted by this reviewer, a count 318 of one type of assessment for the reviewer (in this case, the number of positive rating votes cast for the reviews of this reviewer by evaluator users, such as for evaluations that are not determined to be unreliable), and a graphical badge indication 319 related to the rank of the reviewer—in other embodiments, some or all of this information may instead be presented in other formats or instead not be presented. In addition, while not illustrated here, in some embodiments one or more assessed user contribution scores or ratings for the reviewer may be displayed, while in other embodiments such information may be used only for internal purposes by the merchant (e.g., as part of determining a reviewer's rank, etc.) and not made directly available to the reviewer user and/or to other users. Similarly, in some embodiments one or more indications of fans and/or critics of Reviewer C may be illustrated, such as a total number of current fans or cumulative number of fans.

FIG. 4 is a display diagram illustrating an example of a display 400 that provides detailed information about an available item along with item review content regarding the item. In this example, the item is the Tchaikovsky Symphony No. 6 DVD whose review is shown in FIG. 3, and the display 400 illustrates a portion of a Web page provided to a customer with information about the item (e.g., in response to the selection of link 322 shown in FIG. 3, or otherwise as requested by the customer). In this example, the display 400 includes summary rating information 425 for the item, which in this example indicates that the average customer rating for this item is 4 out of 5 stars. In addition to other information about the item, the display 400 also includes a list of one or more item review pieces of content submitted for the item by review authors, including review 410 submitted by example author user Reviewer C. In this example, the display of the review 410 includes the reviewer's name 411 (which in this example is a link to the display shown in FIG. 3); a graphical badge 412 related to the current rank of the reviewer; the item rating or grade 413 assigned to the item as part of the review; the review title 414; and the textual item review content.

The display 400 in this example further includes a link 421 that solicits the current user to whom the display 400 is presented to author his or her own item review of the Tchaikovsky Symphony No. 6 DVD item, such as when the current user has not yet provided a review for the item, as discussed further with respect to FIG. 6. In this example, the display 400 also includes a section 450 that the current user may use to rate the item without providing a textual review, such as by selecting one of the star rating selections 452 to provide an enumerated rating of the item. In addition, the current user may select an illustrated button 454 to indicate ownership of the item. In such embodiments, if the current user performs an evaluation of the item using the star rating selections 452 or other rating selections (not shown), the summary rating information 425 about the item may be updated for that current user and/or for future users to whom information about the item is displayed. Alternatively, if the new evaluation from the current user for the item is determined by an embodiment of the Evaluation Assessment system to not be sufficiently reliable, the summary rating information 425 may in some embodiments not be updated for the current user and/or for future users, while in other embodiments the summary information for such displays may be updated but with the new evaluation not actually used for other purposes (e.g., in determining an aggregate rating for the item). In other embodiments, the summary information 425 may be initially updated to reflect the new evaluation if it is not immediately determined to be sufficiently unreliable (e.g., based on an assessment of the reliability of such evaluations being performed only periodically, such as once per hour or once per day; based on the series of evaluations by the current evaluator user not yet matching a pattern of unreliability with respect to a reliability assessment type, but with the current evaluation and later evaluations of other items in aggregate being later determined to match such an unreliability pattern; etc.), but may be later removed from having influence on the summary rating information 425 if it is determined at a later time to be sufficiently unreliable.

In addition, in embodiments in which this display is provided to a current user other than Reviewer C who has not yet evaluated this Reviewer C review of the item, the display may further include review evaluation rating selections to allow the current user to act as an evaluator and provide an evaluation for the review. In addition, in at least some embodiments, if the current user has previously been identified as a current fan or critic of Reviewer C, the review evaluation rating selections for the Reviewer C item review 410 may not be provided for the item review (e.g., if any such evaluation provided by the current user for the item review will be ignored), while in other embodiments such review evaluation rating selections will nonetheless be provided. In this example, two evaluation rating selections 415 and 416 are displayed to allow the user to specify a quantitative rating of (or "vote" on) the content for each of two rating dimensions, which in the illustrated example are humor and usefulness. Other rating dimensions may instead allow quantitative ratings in a binary manner (e.g., via "yes" and "no" votes, such as in rating selection 417 for a prior item review shown for the item), in a non-quantitative manner (e.g., by gathering textual comments about the review), in a manner relative to other item reviews (e.g., this is the most informative of all current item reviews for this content, or of all item reviews by this author user, or of all the item reviews for any content), etc.

While not illustrated here, in some embodiments the information displayed for item review 410 may further provide evaluation summary information about at least some of the evaluations of the review, such as to indicate that a certain quantity or percentage of evaluator users who have provided evaluations of the review have found this item review content piece to be helpful or otherwise useful (e.g., "12 of 17 people found the following review helpful", or "The average usefulness rating of this review from 17 people is 4.2"), or to otherwise provide other types of feedback from the evaluations of this content piece by evaluator users. In such embodiments, if a current user performs an evaluation of the item review 410 using the evaluation rating selections 415 and/or 416 or other evaluation rating selections (not shown), the evaluation summary information about the item review 410 may be updated for that current user and/or for future users to whom information about the item review 410 is displayed (e.g., "13 of 18 people found the following review helpful" if the current user selects a "yes" helpfulness vote button, not shown, or "The average usefulness rating of this review from 18 people is 4.0" if the current user rates the usefulness of the review as a "1"). Alternatively, if the new evaluation from the current user is determined by an embodiment of the Evaluation Assessment system to not be sufficiently reliable (e.g., based on a bias relationship being determined between the current user and an associated user source of the item, such as a manufacturer or distributor of the item or a particular one of multiple merchants who is selling the item, with the determination performed in a manner similar to that discussed elsewhere with respect to assessing evaluations of content pieces), the evaluation summary information may in some embodiments not be updated for the current user and/or for future users, while in other embodiments the evaluation summary information for such displays may be updated but with the new evaluation not actually used in other manners (e.g., for determining an aggregate quality rating for the item review and/or a user contribution rating for Reviewer C). In other embodiments, the evaluation summary information may be initially updated to reflect the new evaluation if it is not immediately determined to be sufficiently unreliable (e.g., based on an assessment of the reliability of evaluations being performed only periodically, such as once per hour or once per day; based on the series of evaluations by the current evaluator user not yet matching a pattern of unreliability with respect to a reliability assessment type, but with the current evaluation and later evaluations in aggregate being later determined to match such an unreliability pattern; etc.), but may be later removed from having an influence on the evaluation summary information if it is determined at a later time to be sufficiently unreliable.

In addition, in some embodiments, at least some of the information selected for the display 400 regarding the available item may be selected in a manner specific to the current user, such as to personalize or otherwise customize the selected information to reflect the current user. For example, if the current user has previously been identified as a current fan of author user Reviewer C, then the item review content piece 410 may be selected for display to the current user based at least in part on that basis. Conversely, if the current user is a current critic of author user Reviewer C and/or a current fan of another content-providing user who has provided an item review for the current item, then another item review for the current item (e.g., the item review for the current item by the other content-providing user of whom the current user is a fan) may instead be provided in lieu of or in addition to the item review 410. Furthermore, in some embodiments, types of information other than item reviews or other types of user-supplied content pieces may be personalized for at least some users, such as information about other complementary or alternative items to the current item that may be provided to the current user in addition to the information about the current item (e.g., to favor other items that are highly rated by content-providing users of whom the current user is a fan), information about recommended items, etc.

FIG. 6 is a display diagram illustrating an example of a display that enables an author user to submit a new review piece of content for an item, with analogous information to allow evaluator users to submit textual and other evaluations similarly able to be provided (although not shown here for the sake of brevity). The user typically receives this display in conjunction with a particular item, for which the user can submit a review, although in other situations users could submit information not specific to an item (e.g., a blurb for a personal blog of the user). In this example, display 600 is provided in response to the user's selection of link 421 in the display containing detailed information about the Tchaikovsky Symphony No. 6 DVD shown in FIG. 4. The display includes the identity of the user 601, which is attributed as the identity of the reviewer. To attribute a different identity to the reviewer, the user can select link 602. The display also includes information 603 identifying the item to be reviewed, a control 604 used by the user to specify a grade or rating evaluation for the reviewed item, a field 605 for entering a title for the review, and a field 606 for entering the textual or other contents of the review. In this example, the user may select radio button 607 in order to display a reviewer name with the review, which may be edited in field 608. Alternatively, the user may select radio button 609 to make the review anonymous (which in some embodiments may cause the submission of the review and/or any rating of the review to not affect the author's user contribution rating). The display also includes field 610 for entering the author's location, although in embodiments in which the user has previously corroborated his/her identity, information such as that in fields 608 and/or 610 may not be displayed or modifiable. Before preparing the review as described, the user may also select link 621 in order to display guidelines for preparing the review and/or may select link 622 in order to display one or more example customer reviews demonstrating compliance with the review guidelines. When the user has assembled the review to be submitted, the user selects button 611.

FIG. 5 is a display diagram illustrating an example of a display 500 that provides information about two randomly-selected top-ranked reviewers as part of a portion of a Web page related to other types of information, with analogous information about top-ranked evaluator users similarly able to be provided (although not shown here for the sake of brevity). The display 500 includes a list 510 of randomly-selected highly ranked reviewers, which can be comprised of one or more entries, and in this illustrated embodiment includes entries 520 and 530. The display also includes a link 540 to the top reviewer's list shown in FIG. 2, which is a display diagram illustrating an example of a display 200 that shows a list of top-ranked reviewers. This example display 200 includes language 201 congratulating the top-ranked reviewers and an ordered list 210 of the top-ranked reviewers. List 210 is comprised of ordered entries, each corresponding to one top-ranked reviewer, such as entries 220, 230, and 240. As an example, entry 220 contains information about the highest-ranked reviewer. This entry contains the reviewer's rank 221, as well as a graphical badge 222 indicating the rank. The entry further contains the name of the reviewer 223, which is a link that the user can select in order to view more detailed information about this reviewer, as well as an indication 224 of the total number of reviews authored by this reviewer. The entry also contains further information 225 about the reviewer, which is typically provided by the reviewer. The information in this example includes a link 226 that may be selected by the user to display additional information about the reviewer. Some entries also contain an image of the reviewer, such as a representative image 237 shown in entry 230. While not illustrated here, in some embodiments, an entry for a top-ranked reviewer may further include information about some or all fans and/or critics of the reviewer, such as to indicate a number of current fans and/or total cumulative fans of the reviewer, and/or to indicate additional information about some or all such fans (e.g., identities of fans, average ratings of the reviewer's item reviews by the fans, an alternative rating and/or ranking of the reviewer if the evaluations from the reviewer's fans are considered, rankings of various reviewers relative to each other based on their numbers of fans, etc.). In addition to the list 210 of detailed entries about the top-ranked reviewers, the display also contains a more abbreviated list 250 of the top-ranked reviewers. In this list, each entry is merely the rank value and the name of the reviewer, which is a link that may be selected by the user to display additional information about the reviewer. Such information about top-ranked reviewer users, and analogous information about top-ranked evaluator users, may similarly be provided in a variety of other ways.

While the examples discussed above with respect to FIGS. 2-6 have included a number of simplifying assumptions for the sake of clarity, in other embodiments a variety of additional types of evaluations and other user-supplied information may be obtained and assessed with respect to reliability, with sufficiently reliable such evaluations and other user-supplied information able to be used in a variety of manners. Similarly, in other embodiments, a variety of additional types of information and techniques may be used for other purposes, such as part of automatically assessing user contribution scores and other ratings for author users and other content-providing users, as well for automatically rating quality and other attributes of pieces of content. For example, in some embodiments, an evaluator user may be determined to be a fan or critic of a particular content-providing user with respect to different types of pieces of content that the content-providing user may supply and/or evaluate (e.g., content of different forms, such as item reviews versus photos; content with different types of subject matter, such as item reviews or other supplied content for books versus item reviews or other supplied content for electronics; etc.).

In addition, in some embodiments, the various content-providing users may be clustered into multiple user groups in various manners (e.g., based on similarities in their activities, opinions, demographic information, shopping activities, assessed user contribution scores, etc.), and each content-providing user may further be assessed one or more user contribution scores for each of the user groups (e.g., to reflect that the other users in the group to which a user belongs consider the content supplied by the user to be highly useful, while users in other groups do not consider the user's supplied content to be useful). Alternatively, in some embodiments information from a user (e.g., supplied pieces of content and/or evaluations) may only be used with respect to other users in the same group, such as to be provided to them and to receive evaluations from them. Similarly, in such embodiments, a determination of whether an evaluator user is a fan or critic of a content-providing user may further be based at least in part on whether the evaluator user and content-providing user are part of the same user group (e.g., to only identify evaluator users as fans and/or critics of content-providing users if the evaluator users are in the same user group as the content-providing users or are in a different user group from the content-providing users). Such groups of users may be determined in various ways, including in an automated manner using one or more clustering algorithms (e.g., a k-means cluster analysis). In at least some such embodiments, each user may be assigned to a single user group, while in other embodiments a user may be part of multiple user groups (e.g., different groups for different roles or other activities of the user).

In a similar manner, in some embodiments, each piece of content may have multiple content quality scores that not only reflect different attributes (or aspects or qualities or properties) of the content piece (e.g., helpfulness or more generally usefulness, informativeness, inappropriateness, accuracy, being spam, humorousness, etc.), but that further reflect different user groups. Thus, for example, a piece of content may have an assessed usefulness score for a first group of users that is high, and have other assessed usefulness scores for other groups of users that are low (e.g., to reflect different opinions or perspectives of users in different groups; to reflect different capabilities or knowledge of users in different groups, such as to be highly useful to a group of users with a high degree of specific technical knowledge but to be of little use to users without that technical knowledge; etc.). In order to assess the different scores for different groups of users, in some embodiments only evaluations from other users in the group will be used, or evaluations from users in other groups may be discounted. In addition, in at least some embodiments, scores for different groups of users may be assessed in different manners, such as based on input received from users in those groups or on other information specific to the group. Furthermore, in embodiments in which users may each have multiple assessed user contribution ratings, different assessed contribution ratings of a user may be used when assessing scores for different groups of users, such as to use an assessed contribution rating specific to a group of users. In addition, in some embodiments, other information specific to a user may further be used to influence content submissions and/or evaluations from that user, such as an indication of a degree of authority of a user (e.g., to give increased influence based on credentials or recognition in a particular area), other relationships of the user with respect to the merchant (e.g., to give increased influence to a best-selling author of books, at least with respect to submissions and/or evaluations of related material), a relationship of the user with respect to a recipient user who may be provided with content (e.g., to give increased influence to evaluations from users on a buddy list of the recipient user when assessing a content quality score for a piece of content to potentially be provided to the recipient user, such as on a per-recipient user basis, or to give increased influence to evaluations from users who are in a same user cluster or user group as the recipient user), etc. Similarly, in some embodiments, determinations of fan and/or critic relationships between evaluator users and content-providing users may be made at least in part on information other than evaluations by the evaluator users, such as external indicators of relationships (e.g., inclusion on a buddy list, sharing contact and/or financial information, using common computing systems, belonging to the same organizations, living in the same geographic areas, etc.).

In some embodiments, users each may further be provided with information that is specific to that user, such as based at least in part on a user group to which that user belongs and/or based on other user characteristics or user-specific information (e.g., determined fan and/or critic relationships). For example, if content pieces are assessed with different ratings for different user groups, users of a particular group may only be provided with access to content that is sufficiently highly rated for that group, even if other content was highly rated for other groups. Alternatively, all content pieces may instead be available to users of the particular group, but the content ratings specific to that group may be used to influence when and how pieces of content are provided to the users (e.g., in an evolutionary display lifecycle to allow the most highly rated content to be identified and used, such as to primarily show highly rated content, but to also show at least occasional indications of new content to allow evaluations to be received for it and to show at least occasional indications of lower-rated content (such as randomly) to allow subsequent evaluations to raise the ratings if the prior ratings were not reflective of the actual eventual ratings for the content).

As noted above, in some embodiments, the described techniques are used by Web and other online merchants and others to enhance the usefulness of content provided to users (also referred to as "surfacing" the content) for items available from their Web sites or otherwise available. In other embodiments, the described techniques may be used in other ways, such as by an entity providing the techniques to external third-parties (e.g., as a Web service to customers for a fee, such as merchant customers). In addition, in some embodiments various of the calculated and otherwise assessed information (e.g., assessed evaluation reliability, determined bias relationships, assessed user contribution ratings, content quality rating values, etc.) and/or other types of related data (e.g., data available for use in doing the assessing and rating, such as evaluations provided by evaluator users and/or information about activities of users) may be provided to external third parties, such as to allow a user to export their determined fan/critic relationships to Web sites of others in order to receive benefits from those others that are commensurate with those relationships, or to allow the other Web site to better customize their Web site to the users. Similarly, in some embodiments, various types of related information may be received from one or more third parties (e.g., information that may be of use when doing the determination of fan/critic relationships between users), and then used in performing the determination of ban/critic bias relationships. Such exchange of information to and/or from one or more systems performing assessments may in some embodiments be performed for a fee or other compensation, whether to the system(s) from the third party or instead from the system(s) to the third party.

For illustrative purposes, some embodiments are described below in which specific types of content are provided by content-providing users (also referred to as "content providers") and in which specific types of evaluations of the content are provided by other users. In addition, a variety of details are discussed below regarding specific techniques for determining when user-supplied evaluations and other user-supplied information may be unreliable, for calculating specific types of user contribution scores and other ratings for specific types of content-providing users, and for using them in specific ways to provide benefits to requesters of content (e.g., other users, shoppers, etc.). However, it will be appreciated that the inventive techniques are not limited to these details and can be used in a wide variety of other situations, such as to determine and track information about other types of individuals and/or entities (e.g., suppliers, manufacturers, partners, vendors, affiliates, employees, customers, etc.) that provide information/content.

As previously noted, the assessment of user-supplied evaluations and other information may be performed in various manners in various embodiments, such as to determine whether evaluations are unreliable. For example, in some embodiments, various pattern-based analyses are performed on multiple evaluations or other information pieces supplied by a single user in order to identify patterns that correspond to an increased likelihood of unreliability. Such pattern-based analyses may identify patterns involving users of online merchants who have suspicious patterns of activity involving providing evaluations related to items available from the online merchant, including as new users who open a new account and perform evaluations without making purchases or performing one or more other indicated types of activities, new users who open a new account and immediately become prolific raters who provide large numbers of ratings, users who engage in "time block voting" in which significant numbers of ratings are repeatedly performed in relatively small blocks of time interspersed with other periods of time having few or no ratings performed, etc. In addition, some patterns of ratings may further signify the potential participation of an automated software program that is providing ratings on behalf of a user, such as based on a sufficiently large quantity of ratings in a small amount of time. In addition, in some embodiments pattern-based analyses may further identify an unreliable rating in an evaluation from an evaluator user based at least in part on information from other users. For example, a rating from an evaluator user related to an item (e.g., a rating of an item review for the item) may be compared to similar ratings from other users (e.g., ratings for the same item review), such as to detect ratings that are significantly outside the normal range or distribution of ratings. Moreover, when analyzing multiple prior evaluations from a user in light of similar evaluations from other users, additional patterns may be identified, such as a consistent targeted bias of a user for only a subset of the user's evaluations that have one or more common factors (e.g., a bias for or against a particular type or category of item, a bias for or against items from a particular manufacturer user or otherwise associated with a particular user source of the item, etc.), or a consistent disagreement from the consensus of the evaluations from other users.

As previously noted, in at least some embodiments, the quality of provided content pieces may be assessed in various ways, and user contribution ratings for content-providing users and/or evaluator users may be generated based at least in part on assessed content quality. Additional details regarding assessment of content quality, assessment of users, and assessments of evaluations are included in the following patent applications, each of which is hereby incorporated by reference in its entirety: co-pending U.S. patent application Ser. No. 10/646,341, filed Aug. 22, 2003 and entitled "Managing Content Based On Reputation"; co-pending U.S. patent application Ser. No. 11/290,623, filed Nov. 30, 2005 and entitled "Assessing Content Based on Assessed Trust in Users", which is a continuation-in-part of U.S. patent application Ser. No. 10/646,341, filed Aug. 22, 2003 and entitled "Managing Content Based On Reputation," and which is a continuation-in-part of U.S. patent application Ser. No. 11/165,842, filed Jun. 24, 2005 and entitled "Exchanging User Reputation Information"; co-pending U.S. patent application Ser. No. 11/096,699, filed Mar. 31, 2005 and entitled "Automatic Identification of Unreliable User Ratings"; and U.S. patent application Ser. No. 12,165,490, filed concurrently and entitled "Assessing Users Who Provide Content."

In some embodiments, determinations of unreliability of groups of evaluations from an evaluator user are determined with respect to a given window of time (e.g., an evaluation consideration window) during which a content-providing user provided content, an evaluator user provided evaluations of one or more pieces of content provided by one or more content-providing users, and/or an evaluator user otherwise provided one or more types of user-supplied information. In some embodiments, a window of time may be specified as a number of years, months, days, weeks, hours, etc. prior to the time that the reliability determination is performed, such that user bias relationships and other evaluation reliability assessments are determined based on the evaluations received during that time. In other embodiments, a window of time may be defined as having distinct start and end times, such as to make one or more historical such user bias relationship or other evaluation reliability assessments during a distinct time window spanning the start time to the end time (e.g., such as for one or more distinct weeks, months, years, decades, etc.). In some embodiments, such user bias relationship or other evaluation reliability assessments may be performed without consideration of any specified window of time in which an evaluator user has provided evaluations, such as in embodiments where any evaluations of an evaluator user may be considered for the user bias relationship and other evaluation reliability assessment.

In addition, in some embodiments, user bias relationships and other evaluation reliability assessments may instead be determined to reflect evaluations of reviews with regard to one or more specific item categories (e.g., movies, books, electronics, etc.), such that, for example, an evaluator user may be a fan or critic of a content-providing user with respect to reviews for only one or a subset of the one or more specific categories (e.g., movie reviews, book reviews, electronic reviews, clothing reviews, restaurant reviews, club reviews, etc.). In other such embodiments, user bias relationships and other evaluation reliability assessments may be performed based on one or more specified genres and/or other subject matter of items (e.g., non-fiction, literature, science fiction, romance, fantasy, regional, etc.), such as to correspond to evaluations corresponding to those genres or other item subject matter types. In still other embodiments, user bias relationships and other evaluation reliability assessments may be based on one or more of other types of user-provided information and/or on evaluations of such other types of user-provided information, such as content including user-provided commentary on various topics (e.g., other than item reviews), images, videos, news items, short stories, poems, recipes, course work, dissertations, computer code, etc., and in some such embodiments, only one or more of the other types of content may be considered with respect to determining user bias relationships and other evaluation reliability assessments. In other embodiments, all types or a subset of types of all content provided by a user may be used when determining user bias relationships and other evaluation reliability assessments.

Figure 7:
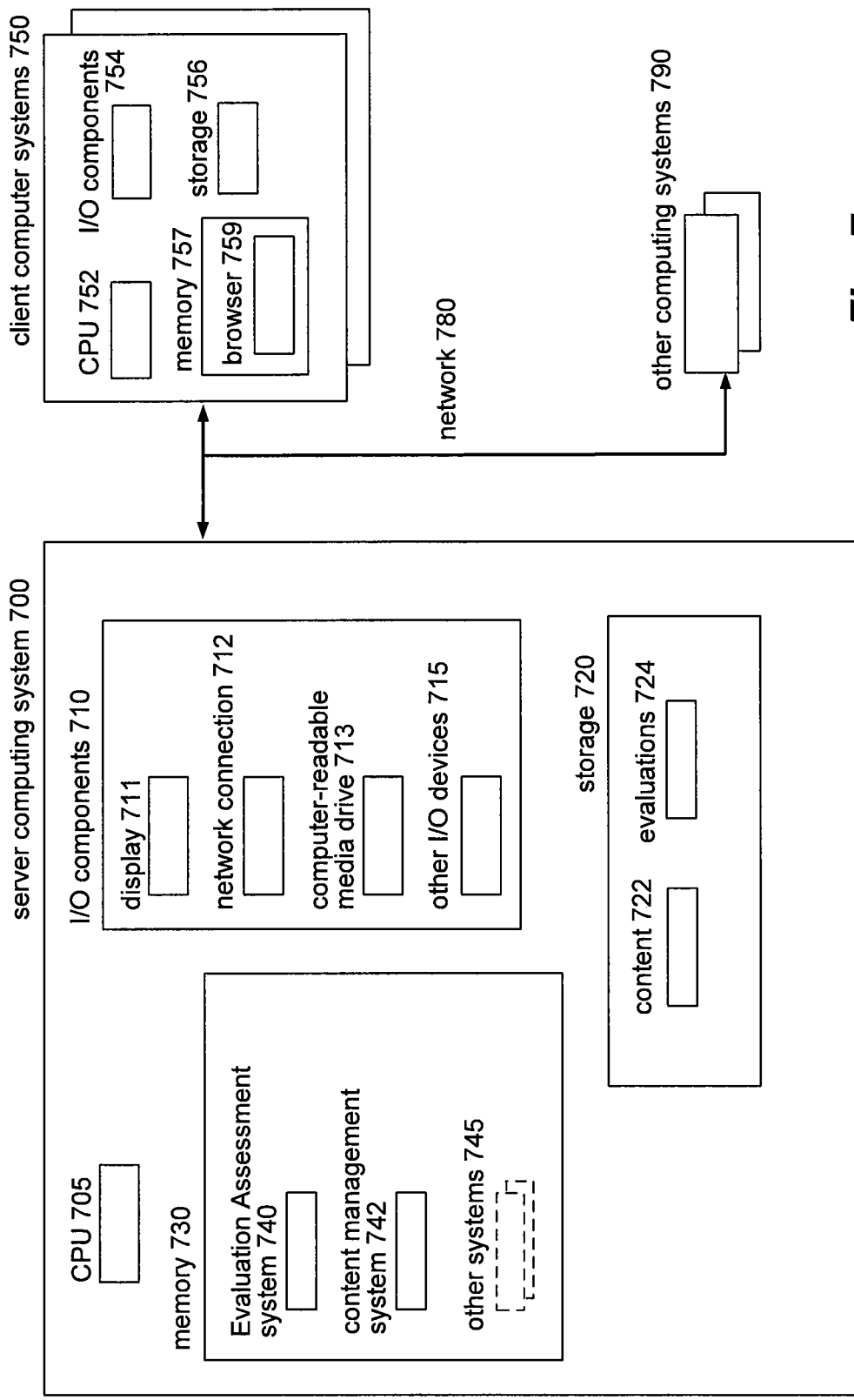
FIG. 7 is a block diagram illustrating an embodiment of a computing system for performing techniques to automatically assess user-supplied evaluations of content provided by other users.

FIG. 7 is a block diagram illustrating an example computing system suitable for performing techniques to automatically assess reliability of user-supplied evaluations and/or other user-supplied information. In particular, FIG. 7 illustrates an example server computing system 700 suitable for assessing user-supplied information, as well as various example client computing systems 750 and other computing systems 790. In the illustrated embodiment, the server computing system 700 has components that include a CPU 705, various input/output ("I/O") components 710, storage 720, and memory 730, with the I/O components illustrated in this example embodiment including a display 711, a network connection 712, a computer-readable media drive 713, and various other I/O devices 715 (e.g., a keyboard, mouse, speakers, etc.). In addition, each of the client computing systems 750 has components that include a CPU 752, various I/O components 754, storage 756, and memory 757. The I/O components 754 may include components similar to those described with respect to the computing system 700.

In the illustrated embodiment, embodiments of an Evaluation Assessment system 740 and a content management system 742 are each executing in memory 730, as are one or more optional other systems 745, although in other embodiments the systems 740, 742 and 745 may each execute on distinct computing systems, or a single software system may provide functionality of two or more such systems. The Evaluation Assessment system 740 operates to assess user-supplied evaluations to determine bias relationships and/or other indications of unreliability of the evaluations, as discussed in greater detail elsewhere, and in other embodiments may similarly assess other types of user-supplied information in addition to or instead of user-supplied evaluations.

The content management system 742 receives content pieces submitted by content-providing users via network 780, such as from one or more content-providing users interacting with a client computer system 750. For example, in some embodiments, a content-providing user may submit content pieces by interacting with a Web page similar to that of FIG. 6 provided by a browser 759 executing in memory 757. After a content piece is received by the content management system, the content management system may store the content piece and/or information associated with the content piece (e.g., time created, content-providing user identifier, content piece identifier, relationship to other content, one or more categories associated with the content piece, etc.) in storage 720, such as with content information 722.

In addition, the illustrated content management system 742 may also provide received content pieces to one or more users, such as for display to the users and/or to obtain evaluations of the content pieces from the one or more users. For example, in some embodiments, one or more users may interact with one or more of the client computer systems 750 to obtain content pieces from the content management system 742, such as for display in browser 759 in a manner similar to that of FIGS. 3-5. In some embodiments, the content management system may provide to the one or more users information and/or interactive features related to evaluating the content pieces, so that the one or more users may assess various attributes of interest of the content pieces, such as by interacting with a Web page similar to that of FIG. 4 to indicate one or more assessments of the content based on one or more rating dimensions (e.g., helpfulness, humor, etc.), and may obtain such evaluations from the users. In this embodiment, the obtained evaluations may be stored in storage 720 (e.g., as part of evaluations information 724) along with information associated with the obtained evaluations (e.g., time submitted, identifier of evaluated content, evaluator user identifier, etc.).

In other embodiments, rather than interact directly with an embodiment of the content management system 742, users of client computer systems 750 may interact with one or more Web servers and/or other software provided by the server computing system 700 that operate in a coordinated manner with the content management system 742 to exchange information, such as one or more of the optional other systems 745 executing in memory 730. In other embodiments, one or more other computing systems 790 may execute Web servers and/or other provided software to receive content pieces from content-providing users and/or evaluations from evaluator users, and in such cases, the one or more other computing systems 790 may operate in a coordinated manner with the server computing system 700 such that the content pieces and/or evaluations may be provided to the content management system 742 (e.g., such as via Web services and/or other programmatic interfaces). In some such embodiments, the one or more other computing systems 790 may be operated by the same entity that operates the server computing system 700 and/or by other entities. Similarly, in some embodiments, the one or more other computing systems 790 may interact with content management system 742 to obtain information related to submitted content pieces and/or supplied user evaluations, such as to provide such information to one or more users and/or entities. In still other embodiments, the content management system may be incorporated into one or more other computing systems 790. In some embodiments, the optional other systems 745 may include one or more of a user contribution rating system that assess content-providing users and/or evaluator users based at least in part on their provided content pieces and supplied evaluations, and a content quality rating system that generates quality and/or other ratings of content pieces.

As previously noted, a Web server may be provided by the server computing system 700 and/or other computing systems 790 in some embodiments, such that users of client computing systems 750 may request information from and/or provide information to the Web server by using Web browsers 759 executing in memory 757 of the computing systems 750. In such embodiments, the Web server may respond with appropriate information to be displayed or otherwise presented to the users, such as on display devices (not shown) of the I/O components 754 of the computing systems 750. For example, in some situations, a Web server may be used by a Web merchant to provide shopping-related functionality to users who are customers of the merchant, such as to provide information about available products. In some embodiments, the Web server may interact with the content management system 742 to select appropriate user-supplied content pieces to provide to users, such as in conjunction with other content provided by the merchant and/or content management system. Similarly, the Web server may obtain information related to determined fan or critic bias relationships to include along with other information provided to users. In addition, when new pieces of content or new evaluations are supplied by content-providing users or evaluator users to the Web server, the Web server may interact with the content management system 742 or other component (not shown) to store the submitted content piece or evaluation. In addition, while in some embodiments the systems 740, 742 and/or 745 are operated as part of an organization with one or more Web servers in order to support the one or more Web sites provided by those Web servers for the organization, in other embodiments one or both of the systems may also or instead interact with various external third-party computer systems, such as to provide evaluation assessment-based functionality to them as a service (e.g., as a Web service) and/or to exchange evaluation assessment-related information with them.

It will be appreciated that computing systems 700, 750 and 790 are merely illustrative and are not intended to limit the scope of the present disclosure. For example, computing system 700 may instead be comprised of multiple interacting computing systems or devices, and may be connected to other devices that are not illustrated, including through one or more networks such as the Internet or via the World Wide Web ("Web"). More generally, a "client" or "server" computing system or device may comprise any combination of hardware or software that can interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes, DVRs, etc.), and various other consumer products that include appropriate inter-communication and computing capabilities. In addition, the functionality provided by the illustrated systems may in some embodiments be combined in fewer systems or distributed in additional systems. Similarly, in some embodiments the functionality of some of the illustrated systems may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 8:
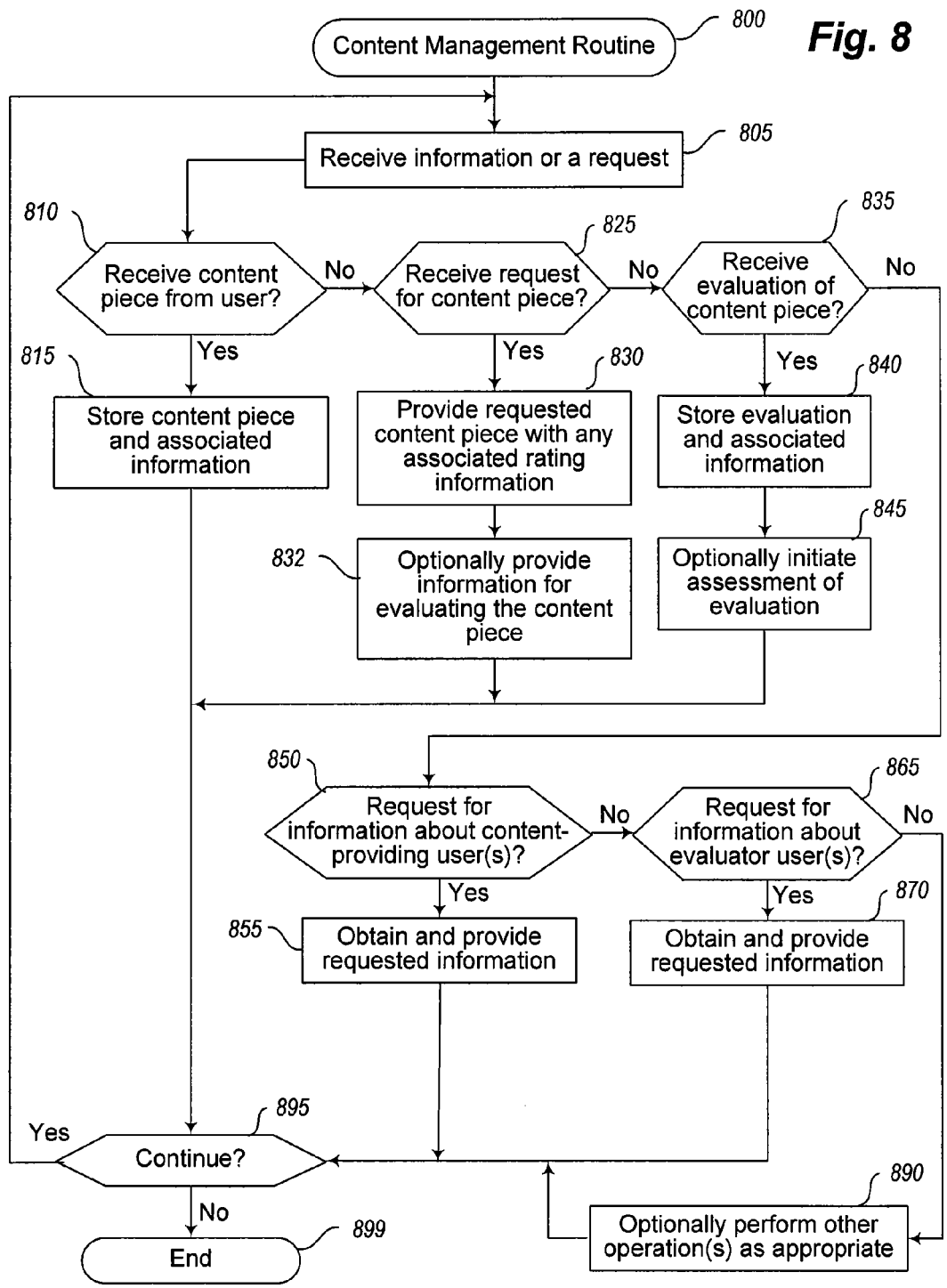
FIG. 8 is a flow diagram of an example embodiment of a Content Management routine.

FIG. 8 is a flow diagram of an example embodiment of a Content Management routine 800. The routine may, for example, be provided by execution of an embodiment of the content management system 742 of FIG. 7 and/or the content management system 146 of FIG. 1, such as to, in this illustrated embodiment, manage information with respect to content pieces provided by one or more content-providing users and to obtain user-supplied evaluations of content pieces.

The illustrated embodiment of the routine begins at block 805, where an indication of information or a request is received. The routine continues to block 810 to determine whether one or more content pieces have been received from a content-providing user, and if so continues to block 815 to store the content pieces and any associated information (e.g., time received/created, content-providing user identifier, related content, etc.) for later use. In various embodiments, the routine may perform one or more various other operations upon receiving a content piece, such as filtering the content piece for appropriateness; notifying one or more systems, processes, routines, users and/or entities that a content piece has been received (e.g., such as for purposes of compensating and/or rewarding a content-providing user, such as to further process the received content piece, etc.); provide information to the content provider who provided the piece (e.g., confirmation message, an award, etc.); etc.

If it is instead determined in block 810 that a content piece was not received, the routine continues to block 825 to determine whether a request for one or more content pieces has been received. If so, the routine continues to block 830 to provide the requested content pieces, including in some embodiments and situations to customize provided information in one or more manners (e.g., based on previously determined bias relationships involving the user to whom the information will be provided). After block 830, the routine continues to block 832 to optionally provide additional information related to enabling the receiving user to evaluate a content piece, such as information related to one or more attributes of interest (e.g., rating dimensions such as helpfulness, humor, etc.) of the content piece to be assessed by an evaluator user and associated user-selectable controls, and such as in situations when the potential evaluator user is not the content-providing user who supplied the content piece and has not already evaluated the content piece, but regardless of whether a bias relationship currently or previously exists between the receiving user and the content-providing user who provided the content piece.

If it is instead determined in 825 that a request for a content piece was not received, the routine continues to block 835 to determine whether one or more evaluations of one or more content pieces have been received, and if so continues to block 840. For example, in some embodiments, the routine may receive one or more evaluations of a content piece, such as evaluations based on one or more assessed attributes of interest related to the content piece (e.g., helpfulness, humor, etc.). In some embodiments, such evaluations may have been performed by one or more evaluator users who assessed one or more attributes of interest related to the content piece, such as one or more evaluator users who received optional information related to evaluating a content piece (e.g., in block 832) and provided an evaluation based on the received information. In some embodiments, at least some of the received evaluations may have been performed at least in part by an automated method (e.g., natural language processing, image analysis, etc.). In block 840, the received evaluations are stored for later use along with any associated information as appropriate (e.g., time received/evaluated, evaluator identifier, related content piece identifier, evaluation method, etc.). After block 840, the routine continues to block 845 to optionally initiate an assessment of the received evaluation(s) with respect to reliability, although in other embodiments such assessments may be performed at other times (e.g., periodically).

If it was instead determined in 835 that an evaluation of a content piece is not received, the routine continues to block 850 to determine whether a request is received for information about one or more content-providing users, and if so continues to block 855 to obtain and provide information corresponding to those content-providing users. The provided information may have various forms, such as user contribution ratings of one or more content-providing users, information about determined fan/critic bias relationships for the content-providing users, etc. In some embodiments, such a request may include indications of one or more particular content-providing users for which information is desired and/or indications of one or more other identifiable characteristics of a content-providing user (e.g., all content-providing users, a number of top-rated reviewer users, etc.). In addition, in some embodiments, such requests may include an indication of one or more specific types of desired information about the content-providing users.

If it is instead determined at block 850 that a request for information about content-providing users was not received, the routine continues to block 865 to determine whether a request is received for information about one or more evaluator users, and if so continues to block 870 to obtain and provide information corresponding to those evaluator users. The provided information may have various forms, such as user contribution ratings of one or more evaluator users, information about determined fan/critic bias relationships for the evaluator users, etc. In some embodiments, such a request may include indications of one or more particular evaluator users for which information is desired and/or indications of one or more other identifiable characteristics of an evaluator user (e.g., all evaluator users, a number of top-rated evaluator users, etc.). In addition, in some embodiments, such requests may include an indication of one or more specific types of desired information about the evaluator users.

If it was instead determined in block 865 that a request for information about evaluator users was not received, the routine continues to block 890 to optionally perform one or more indicated operations as appropriate, such as to configure how and when evaluation assessments may be triggered and/or performed. After blocks 815, 832, 845, 855, 870 and 890, the routine continues to block 895 to determine whether to continue, such as until an explicit indication to terminate is received. If so, the routine returns to block 805, and otherwise the routine continues to 899 and ends.

Figure 9:
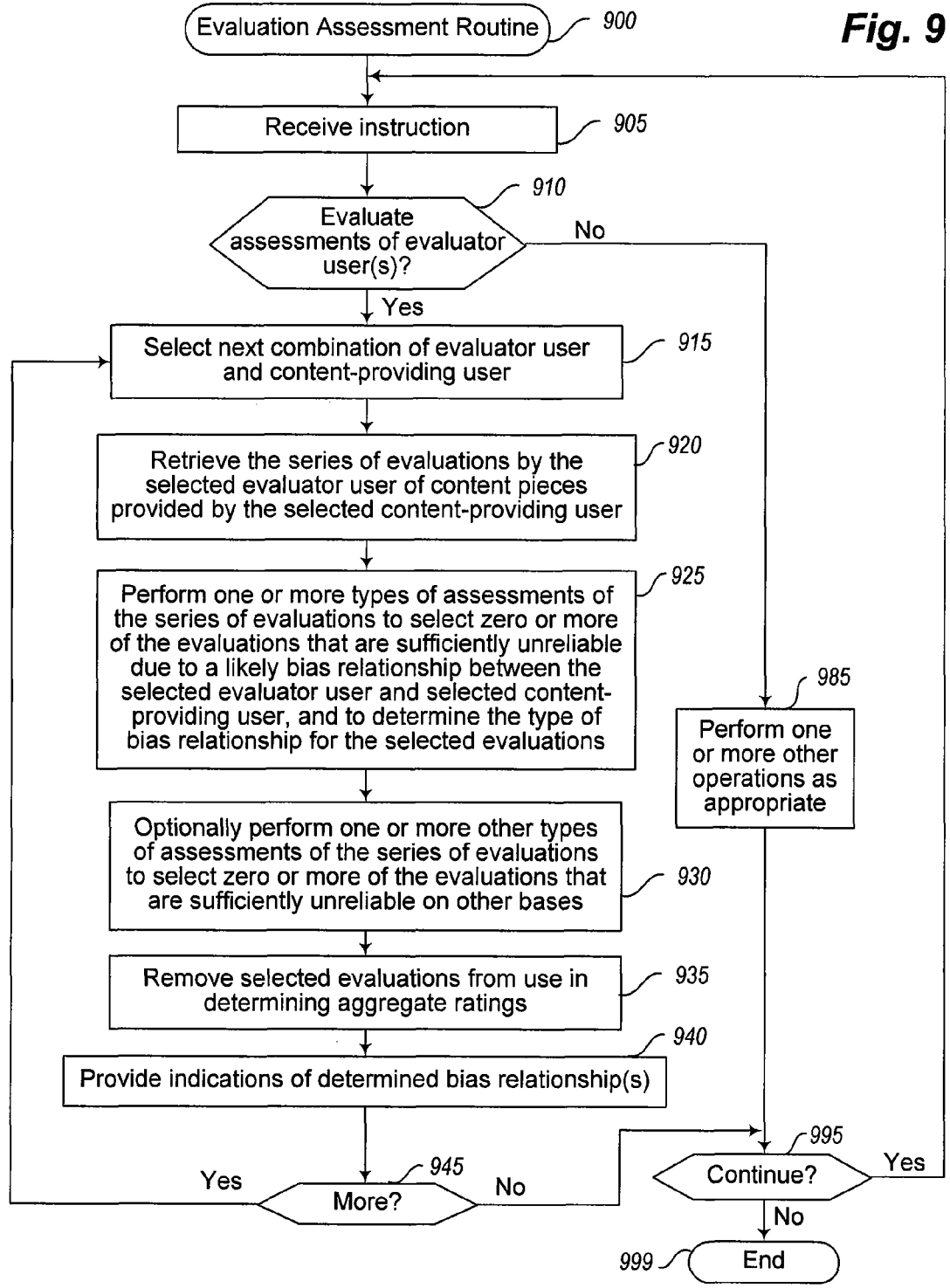
FIG. 9 is a flow diagram of an example embodiment of an Evaluation Assessment routine.

FIG. 9 is a flow diagram of an example embodiment of an Evaluation Assessment routine 900. The routine may, for example, be provided by execution of an embodiment of the Evaluation Assessment system 740 of FIG. 7 and/or the evaluation assessment system 142 of FIG. 1, such as to, in this illustrated embodiment, assess reliability of user-supplied evaluations. While indications of evaluation reliability determinations and determinations of bias relationships are generated and provided to an external system in this illustrated embodiment, in other embodiments the information may be stored for later use and/or used directly by the routine 900 in various manners.

The illustrated embodiment of the routine begins at block 905, where an indication is received of information or an instruction. The routine continues to block 910 to determine whether to assess reliability of one or more user-supplied evaluations, such as based on an instruction that indicates to do so (e.g., a periodic or other instruction to assess all evaluations or a specified subset of evaluations, such as evaluations supplied since a prior assessment of evaluations was performed; a periodic or other instruction to assess some or all evaluations supplied by one or more indicated evaluator users; a periodic or other instruction to assess evaluations supplied for one or more indicated content pieces; a periodic or other instruction to assess some or all content pieces provided by one or more indicated content-providing users; etc.), based on receiving at least one of those one or more user-supplied evaluations, etc. If so, the routine continues to block 915 to select a next combination of an evaluator user who supplied one or more of the evaluations to be assessed and a content-providing user who provided at least one content piece evaluated by the evaluator user in at least one of the evaluations to be assessed, being with a first such combination. If only a single evaluation is indicated to be assessed, for example, then only one such combination of evaluator user and content-providing user will exist for that single evaluation.

After block 915, the routine continues to block 920 to retrieve information about a series of evaluations supplied by the selected evaluator user for content pieces provided by the selected content-providing user, such as from input to the routine 900 if the information about some or all such evaluations is received in block 905, or to retrieve information about prior evaluations for the selected evaluator user and content-providing user if one or more new evaluations are indicated in block 905. In some embodiments, all prior evaluations for the selected evaluator user and content-providing user may be retrieved, while in other embodiments a time period or other criteria may be indicated such that only a subset of possible evaluations that correspond to that time period or other criteria are retrieved.

The routine then continues to block 925 to perform one or more types of bias-related assessments on the series of evaluations so as to identify zero or more of those evaluations that are unreliable. As discussed in greater detail elsewhere, the one or more assessment types may include one or more bias assessment types in at least some embodiments that determine whether a bias relationship exists between the selected evaluator user and selected content-providing user for one or more of the evaluations, and if so to identify a type of the bias relationship (e.g. a fan bias relationship; a critic bias relationship; another type of bias relationship, such as with all evaluations being average or random or otherwise selected regardless of the underlying content piece being evaluated; etc.). If multiple bias assessment types are used, the results of the multiple assessment types may be combined in various manners to determine whether a bias relationship exists for one or more of the evaluations, such as to determine that a bias relationship exists if any of the assessment types indicate such a bias relationship, to aggregate or otherwise combine an indicated degree of likelihood or probability of possible bias for each evaluation from each assessment type so as to determine whether the combined bias likelihood or probability for an evaluation is sufficiently high to determine that a bias relationship exists, etc.

After block 925, the routine continues to block 930 to optionally perform one or more other types of assessments of unreliability on the series of evaluations so as to identify zero or more of those evaluations that are unreliable. As discussed in greater detail elsewhere, the one or more other assessment types may have various forms in various embodiments. The results of the assessment types of block 925 and of any assessment types performed in block 930 may be combined in various manners, such as to identify an evaluation as unreliable if any of the assessment types indicate such unreliability, to aggregate or otherwise combine an indicated degree of likelihood or probability of unreliability for each evaluation from each assessment type so as to determine whether the combined unreliability likelihood or probability for an evaluation is sufficiently high to designate the evaluation as being unreliable, etc.

After block 930, the routine continues to block 935 to designate any evaluations selected in blocks 925 and/930 as being unreliable, such as to exclude the selected evaluations from use in determining aggregate ratings for content pieces and/or content-providing users, or to otherwise reduce the influence given to the selected evaluations for such purposes. In other embodiments, the routine 900 may instead provide an indication of the selected evaluations (and optionally a degree or type of unreliability for each selected evaluation) to another system that determines whether and how to exclude or otherwise reduce the influence of the selected evaluations, such as a content quality rating system. In the illustrated embodiment, the routine then continues to block 940 to provide an indication of any determined bias relationship for one or more selected evaluations, as well as to optionally indicate the selected evaluations. While not illustrated here, various information about the assessment may similarly be stored for later use by the routine 900 or another system, including information about unreliable evaluations and determined bias relationships.

After block 940, the routine continues to block 945 to determine whether there are more unique combinations of evaluator users and content-providing users to assess, and if so returns to block 915. Otherwise, the routine continues to block 995. If it was instead determined in block 910 that reliability of one or more user-supplied evaluations is not to currently be assessed, the routine continues instead to block 985 to optionally perform one or more other indicated operations as appropriate, such as to configure how and when evaluation assessments are performed (e.g., to specify particular thresholds, to indicate groups of evaluator users for which different thresholds are used or the evaluation assessment is otherwise performed differently, etc.). After block 985, the routine continues to block 995 to determine whether to continue, such as until an indication to terminate is received. If so, the routine returns to block 905, and if not continues to block 999 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners. Any data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of an online merchant to assess reliability of evaluations supplied by users of the online merchant, the method comprising:

receiving multiple pieces of content that are created by multiple author users and that are supplied to the online merchant for use by customers of the online merchant, the author users being a subset of the customers of the online merchant and the pieces of content each being a customer-generated textual item review for one of multiple items available from the online merchant, each of the multiple author users creating one or more of the multiple item review content pieces;

assessing the multiple item review content pieces by, receiving multiple evaluations of the multiple item review content pieces that are supplied by multiple evaluator users who are customers of the online merchant, each of the received evaluations being from one of the evaluator users for one of the item review content pieces and including a numerical rating of the item review content piece for each of one or more of multiple predefined rating dimensions, each rating dimension related to an aspect of the item review content piece such that a numerical rating for the rating dimension indicates an assessment by the evaluator user of a degree to which that aspect of the item review content piece is satisfied, the received evaluations including one or more evaluations for each of the multiple item review content pieces;

identifying one or more of the multiple evaluations that are unreliable by, for each combination of an evaluator user and an author user who created one or more item review content pieces evaluated by the evaluator user, determining a subset of the received evaluations supplied by the evaluator user for the item review content pieces created by the author user; and automatically assessing the evaluations of the determined subset to identify whether any of the evaluations of the determined subset are unreliable based at least in part on bias of the evaluator user towards the author user being detected, the detecting of the bias of the evaluator user towards the author user being based at least in part on analysis of the numerical ratings included in the evaluations of the determined subset; and automatically determining quality ratings for each of the multiple item review content pieces and for at least one of the multiple rating dimensions based on the numerical ratings of the received multiple evaluations other than the identified unreliable evaluations; and providing one or more indications of at least some of the determined quality ratings.

2. The method of claim 1 further comprising:

receiving multiple requests from the customers of the online merchant for information regarding the multiple items available from the online merchant, each of the requests being received from one of the customers and corresponding to one or more of the multiple available items; and responding to each of the multiple requests by selecting one or more of the item review content pieces that include item reviews for at least one of the one or more items to which the request corresponds and by providing the selected one or more item review content pieces to the customer from whom the request was received, the selecting of the one or more item review content pieces being based at least in part on the determined quality ratings of the one or more item review content pieces.

3. The method of claim 1 wherein the detecting of the bias of an evaluator user towards an author user includes determining that a bias relationship exists between the evaluator user and the author user if consistency of the numerical ratings included in a series of multiple evaluations supplied by the evaluator user for the item review content pieces created by the author user exceeds a predefined threshold, and includes selecting each of the multiple evaluations of the series as an identified unreliable evaluation if the bias relationship is determined to exist, and wherein the providing of the one or more indications of the at least some determined quality ratings includes providing information to at least some of the customers of the online merchant about the at least some determined quality ratings and about one or more determined bias relationships between evaluator users and author users.

4. A computer-implemented method for assessing reliability of evaluations supplied by users, the method comprising:

receiving multiple evaluations from an evaluator user, each of the received evaluations being for one of multiple content pieces that are supplied by an author user distinct from the evaluator user and including a quantitative rating of that content piece with respect to an indicated content rating dimension;

automatically assessing the received evaluations to identify one or more of the evaluations that are unreliable, the identifying being based at least in part on a determination that a bias relationship between the evaluator user and the author user exists at one or more times during which the identified one or more evaluations are received; and providing an indication of the identified unreliable one or more evaluations, so that use of the identified unreliable one or more evaluations is inhibited.

5. The method of claim 4 further comprising receiving a plurality of supplied pieces of content that are created by a plurality of author users and that are supplied for use by other users, the multiple content pieces supplied by the author user being a subset of the plurality of supplied content pieces, and receiving a plurality of evaluations of the plurality of supplied content pieces from the evaluator user, the multiple evaluations being a subset of the plurality of evaluations, and wherein the automatic assessing of evaluations is performed for each of multiple of the plurality of author users based on a determined subset of the plurality of evaluations from the evaluator user that are for one or more content pieces created by that author user.

6. The method of claim 5 further comprising receiving a plurality of additional evaluations of the plurality of supplied content pieces that are each from one of multiple other evaluator users distinct from the evaluator user, at least one of the other evaluator users acting as one of the plurality of author users to supply one or more of the plurality of supplied content pieces, and wherein the automatic assessing of evaluations is further performed for each of one or more combinations of one of the other evaluator users and one of the plurality of author users based on a determined subset of the plurality of additional evaluations that are supplied by that one evaluator user and that are for one or more content pieces created by that one author user.

7. The method of claim 4 further comprising automatically determining an aggregate quality rating for each of at least some of the multiple supplied content pieces based at least in part on the received multiple evaluations, the determining performed so as to give less influence to the indicated unreliable evaluations than to supplied evaluations other than the indicated unreliable evaluations.

8. The method of claim 4 wherein the determination that a bias relationship between the evaluator user and the author user exists at one or more times includes automatically determining that consistency of the quantitative ratings included in a group of at least some of the multiple evaluations exceeds a predefined consistency threshold, and wherein the evaluations identified as unreliable include the evaluations of the group.

9. The method of claim 8 further comprising receiving a plurality of additional evaluations of the supplied content pieces from multiple other evaluator users and automatically identifying one or more of the additional evaluations as being unreliable based at least in part on determining that one or more additional bias relationships exist between one or more of the other evaluator users and the author user, the determining that the one or more additional bias relationships exist including selecting one of multiple predefined consistency thresholds for use with each of the other evaluator users in determining whether a bias relationship exists for that evaluator user and the author user, the selecting being based on one or more user characteristics of that evaluator user.

10. The method of claim 9 wherein the method is performed by one or more computing systems of an online merchant that makes items available to customers, wherein the one or more user characteristics of an evaluator user on which the selecting of one of the predefined consistency thresholds is based include at least one of whether the evaluator user has previously purchased any of the available items from the online merchant and of a recency of the evaluator user supplying one or more of the received multiple evaluations, and wherein the method further comprises receiving multiple additional supplied pieces of content that are created by a plurality of other author users and that are supplied for use by other users, the received additional supplied pieces of content being distinct from the received multiple supplied content pieces, the received multiple evaluations not including any evaluations of the multiple additional supplied pieces of content.

11. The method of claim 4 wherein the received multiple evaluations from the evaluator user for the multiple content pieces supplied by the author user are a subset of a plurality of evaluations supplied by the evaluator user for a plurality of supplied content pieces created by a plurality of author users, and wherein the determination that a bias relationship between the evaluator user and the author user exists at one or more times includes at least one of automatically determining that the received multiple evaluations include evaluations of at least a threshold minimum subset of all the content pieces created by one author user, of automatically determining that the received multiple evaluations are at least a threshold minimum subset of all the plurality of evaluations supplied by the evaluator user, and of automatically determining that the plurality of evaluations include, for each of one or more content pieces created by the author user, evaluations of at least a threshold minimum subset of multiple other of the plurality of content pieces that share a common topic with the content piece created by the author user.

12. The method of claim 4 wherein the method is performed on behalf of an organization that provides content pieces to users, wherein the evaluator user uses a first user account with the organization to provide the multiple evaluations, and wherein the automatic assessment of the received evaluations to identify the one or more unreliable evaluations further includes determining whether one or more of the evaluations are disguised duplicates of one or more other evaluations supplied by the evaluator user using one or more other user accounts with the organization.

13. The method of claim 4 wherein the method is performed on behalf of an organization that provides content pieces to users, and wherein the method further comprises:
receiving a plurality of additional evaluations of the supplied content pieces from multiple other evaluator users;
automatically identifying one or more of the additional evaluations as being unreliable based at least in part on determining that one or more additional bias relationships exist between at least one of the other evaluator users and the author user; and
providing information to at least some users of the organization about one or more of the determined bias relationships for the author user.

14. The method of claim 4 further comprising, after the determination that the bias relationship exists between the evaluator user and the author user, customizing future interactions with the evaluator user to reflect the determined bias relationship.

15. The method of claim 4 wherein the indicated content rating dimension for each of at least some of the received multiple evaluations is based on usefulness of the content piece being evaluated, and wherein at least some of the supplied content pieces each include at least one of information supplied to a merchant related to one or more items available for purchase from the merchant and of information available to users of a content provision service, the information supplied to the merchant including at least one of a review of one or more of the available items, a textual description of one or more of the available items, and an image of one or more of the available items, and the information available to the users of the content provision service being in a form that includes at least one of a media file, a streaming media clip, instructional information related to one or more topics, and a list of multiple related elements.

16. The method of claim 4 wherein the received evaluations from the evaluator user that are automatically assessed are selected so as to include only evaluations that correspond to at least one of a subset of the multiple content pieces that are of one of multiple distinct categories of content, and a subset of the multiple content pieces that are of one of multiple distinct types of content.

17. A non-transitory computer-readable medium whose contents cause a computing device to assess reliability of evaluations supplied by users, by performing a method comprising:
obtaining multiple evaluations by a first user of multiple pieces of content provided by a second user, the multiple evaluations including ratings of one or more attributes of at least some of the multiple provided content pieces;
determining a subset of the obtained evaluations by the first user for the multiple pieces of content provided by the second user;
automatically assessing the evaluations of the determined subset to determine whether one or more of the evaluations are unreliable based on at least one of a bias relationship existing between the first and second users when the one or more evaluations are supplied by the first user and of the one or evaluations being disguised duplicates of one or more other evaluations supplied by the first user; and providing an indication of the one or more evaluations if the one or more evaluations are determined to be unreliable.

18. The non-transitory computer-readable medium of claim 17 wherein the automatic assessing of the evaluations of the determined subset includes determining that the bias relationship exists between the first and second users for the one or more evaluations based at least in part on the ratings included in the evaluations, wherein the second user is an author user who creates at least some of the multiple provided content pieces, wherein the first user is an evaluator user distinct from the author user, wherein the multiple evaluations are each for one of the multiple provided content pieces and each include one or more quantitative ratings for the content piece being evaluated, such that the ratings of the one or more attributes of the at least some provided content pieces include the quantitative ratings, and wherein the provided indication includes an indication of the determined bias relationship.

19. The non-transitory computer-readable medium of claim 17 wherein the method is performed on behalf of an organization that provides content pieces to users, wherein the second user is an author user who creates at least some of the multiple provided content pieces for the organization, wherein the first user is a distinct evaluator user who uses a first user account with the organization to provide the multiple evaluations, wherein the automatic assessing of the evaluations of the determined subset includes determining that the one or more evaluations are disguised duplicates of the one or more other evaluations supplied by the first user based at least in part on the one or more other evaluations being provided by the first user when using one or more other user accounts with the organization, the determining including identifying that the first user used the first user account and used the one or more other user accounts, and wherein the provided indication includes an indication of the one or more other user accounts.

20. The non-transitory computer-readable medium of claim 17 wherein the computer-readable medium is a memory of a computing device containing the contents, and wherein the contents are instructions that when executed cause the computing device to perform the method.

21. A computing system configured to assess reliability of evaluations supplied by users, comprising:
one or more memories; and
an evaluation assessment system configured to, for each of one or more evaluator users who each supply multiple evaluations of objects associated with other users such that each of the supplied evaluations includes one or more ratings that each corresponds to an attribute of one of the objects:
determine a subset of the multiple evaluations supplied by the evaluator user for objects associated with one or more of the other users;
automatically assessing the determined subset of the multiple evaluations supplied by the evaluator user to determine whether one or more bias relationships exist between the evaluator user and the one or more of the other users such that one or more of the subset of evaluations are identified as unreliable based on being supplied as part of those bias relationships, the assessing being based at least in part on the ratings included in the subset of evaluations; and
providing an indication of the one or more unreliable evaluations if the one or more bias relationships are determined to exist.

22. The computing system of claim 21 wherein at least some of the objects associated with the other users are pieces of content provided by content-providing users other than the evaluator users, wherein at least some of the included ratings are quantitative ratings, wherein one or more bias relationships are determined to exist for each of at least one of the evaluator users, and wherein the evaluation assessment system is further configured to provide an indication for each of the at least one evaluator users of the one or more bias relationships determined to exist.

23. The computing system of claim 22 further comprising one or more other systems configured to generate an aggregate rating for at least one of one of the content-providing users and one of the provided content pieces based at least in part on at least some of the multiple evaluations supplied by the one or more evaluator users, the generating performed in a manner without using the one or more unreliable evaluations identified for each of the at least one evaluator users.

24. The computing system of claim 21 wherein at least some of the objects associated with the other users are items provided by the other users and made available to customers of an online merchant, wherein one or more bias relationships are determined to exist for each of at least one of the evaluator users, and wherein the online merchant provides at least some of the supplied evaluations for an item to potential customers of the item in a manner without providing the one or more unreliable evaluations identified for each of the at least one evaluator users.

25. The computing system of claim 21 wherein the evaluation assessment system includes software instructions for execution in memory of the computing system.

26. The computing system of claim 21 wherein the evaluation assessment system consists of a means for, for each of one or more evaluator users who each supply multiple evaluations of objects associated with other users such that each of the supplied evaluations includes one or more ratings that each corresponds to an attribute of one of the objects:
automatically assessing at least some of the multiple evaluations supplied by the evaluator user to determine whether one or more bias relationships exist between the evaluator user and one or more of the other users such that one or more of the subset of evaluations are identified as unreliable based on being supplied as part of those bias relationships, the assessing being based at least in part on the ratings included in the subset of evaluations; and
providing an indication of the one or more unreliable evaluations if the one or more bias relationships are determined to exist.

* * * * *